US012718302B2

(12) United States Patent
Karbowiak

(10) Patent No.: US 12,718,302 B2
(45) Date of Patent: Aug. 25, 2026

(54) ARTIFICIAL INTELLIGENCE BASED GENERATION OF FINANCIAL REPORTS AND RESPONSES IN REAL-TIME

(71) Applicant: Kamil Karbowiak, Domaszczyn (PL)

(72) Inventor: Kamil Karbowiak, Domaszczyn (PL)

( * ) Notice: Subject to any disclaimer, the term of this patent is extended or adjusted under 35 U.S.C. 154(b) by 125 days.

(21) Appl. No.: 18/437,690

(22) Filed: Feb. 9, 2024

(65) Prior Publication Data

US 2025/0259247 A1 Aug. 14, 2025

(51) Int. Cl.
*G06Q 40/12* (2023.01)

(52) U.S. Cl.
CPC .................................... *G06Q 40/12* (2013.12)

(58) Field of Classification Search
CPC ...................................................... G06Q 40/12
See application file for complete search history.

(56) References Cited

U.S. PATENT DOCUMENTS

2008/0120129 A1* 5/2008 Seubert ................ G06Q 40/125 705/305
2008/0312980 A1* 12/2008 Boulineau .............. G06Q 10/06 705/7.13
2008/0313110 A1* 12/2008 Kreamer ............ G06Q 10/1097 706/14
2008/0313595 A1* 12/2008 Boulineau ........ G06Q 10/06313 717/101
2008/0313596 A1* 12/2008 Kreamer .......... G06Q 10/06315 717/101
2012/0179511 A1* 7/2012 Lee ................ G06Q 10/063118 705/7.37

(Continued)

FOREIGN PATENT DOCUMENTS

CN 111291547 A 6/2020
CN 116992847 A 11/2023

OTHER PUBLICATIONS

Haan, "Best Accounting Software for Small Business 2024," in Forbes Advisor, updated Jan. 15, 2024, downloaded on Jan. 27, 2024, from https://www.forbes.com/advisor/business/software/best-accounting-software/#:~:text=FreshBooks%20is%20one%20of%20the,and%20clients%2C%20and%20view%20reports.

(Continued)

*Primary Examiner* — Michael Jared Walker
(74) *Attorney, Agent, or Firm* — MUGHAL GAUDRY & FRANKLIN PC

(57) ABSTRACT

At least one example describes mechanisms generating real-time AI-driven financial reports and responses from financial data of a business entity. In at least one example, the financial data including transaction details and account information from different sources is received. Based on the financial data, a financial report template is generated including performance indicators (PIs) that are dynamically generated by a first one or more machine-learning (ML) models. A second one or more ML models generates a mapping strategy automatically linking the PIs to relevant financial data. In at least one example, based on the template and the mapping strategy, a financial report is generated including estimated values of the PIs for specified time. The financial report is evaluated by a third one or more ML models that generates, via a graphical user interface (GUI), a response including a description of valuable insights, anomalies, and patterns in a natural language format.

20 Claims, 18 Drawing Sheets

(56) References Cited

U.S. PATENT DOCUMENTS

| | | | | |
|---|---|---|---|---|
| 2014/0019214 | A1* | 1/2014 | Beaver | G06Q 10/06393 705/7.39 |
| 2015/0227629 | A1* | 8/2015 | Klensch | G06F 16/24545 707/718 |
| 2021/0264520 | A1* | 8/2021 | Cummings | G06Q 40/12 |
| 2021/0342723 | A1* | 11/2021 | Rao | G06Q 40/12 |
| 2021/0350088 | A1 | 11/2021 | Ravi et al. | |
| 2022/0164886 | A1* | 5/2022 | Fernandez Stuyck | G06Q 40/06 |
| 2023/0105564 | A1* | 4/2023 | Breitweiser | H04L 51/04 705/312 |
| 2023/0316206 | A1* | 10/2023 | Nagel | G06F 16/258 705/7.39 |
| 2024/0303281 | A1* | 9/2024 | Sheward | G06F 40/295 |
| 2025/0225428 | A1* | 7/2025 | Meltsner | G06N 20/00 |

OTHER PUBLICATIONS

Snider, "Definition. Profit and Loss Statement (P&L)," Updated Jan. 2014. Retrieved on Jan. 27, 2024 from https://www.techtarget.com/searcherp/definition/profit-and-loss-statement-PL.

Azmi et al., "A Context-Aware Empowering Business with AI: Case of Chatbots in Business Intelligence Systems," in Procedia Computer Science 224 (2023) pp. 479-484 (6 pages).

International Search Report & Written Opinion notified Apr. 25, 2025 for PCT Patent Application No. PCT/PL2025/050011.

* cited by examiner

310

312 Server(s)

314 Software Services

316 Virtual Machines

318 Application(s)

320 Database(s)

325 Business Intelligence

330 AI

Intelligent Edge Data

Intelligent Cloud Analytics

305

Business Intelligence On-Premises

900

725

Chart of Accounts: All ⌄ | Search | + New | Delete | Edit List | Process ⌄ | Report ⌄ | Account ⌄ | Balance ⌄ | More options 810a 810b 905a 810i 810c 810e 810g 810h 905b 910 905c

| No. | Name | Net Change | Balance | Income/Ba... | Account Subcategory | Account Type | Totaling |
|---|---|---|---|---|---|---|---|
| **10000** | **BALANCE SHEET** | – | – | Balance Sh... | Assets | Heading | |
| **10001** | **ASSETS** | – | – | Balance Sh... | Assets | Begin-Total | |
| 10100 | Checking account | 1,638.40 | 1,638.40 | Balance Sh... | Cash | Posting | |
| 10200 | Saving account | – | – | Balance Sh... | Cash | Posting | |
| 10300 | Petty Cash | 96,980.85 | 96,980.85 | Balance Sh... | Cash | Posting | |
| 10400 | Accounts Receivable | 74,480.04 | 74,480.04 | Balance Sh... | Accounts Receivable | Posting | |
| 10500 | Prepaid Rent | – | – | Balance Sh... | Prepaid Expenses | Posting | |
| 10600 | Prepaid Insurance | – | – | Balance Sh... | Prepaid Expenses | Posting | |
| 10700 | Inventory | 73,141.26 | 73,141.26 | Balance Sh... | Inventory | Posting | |
| 10750 | WIP Account, Finished goods | – | – | | | Posting | |
| 10800 | Equipment | 5,498.00 | 5,498.00 | Balance Sh... | Equipment | Posting | |
| 10900 | Accumulated Depreciation | 3,499.00 | 3,499.00 | Balance Sh... | Accumulated Depreciation | Posting | |
| 10910 | WIP Job Sales | – | – | Balance Sh... | Assets | Posting | |
| 10920 | Invoiced Job Sales | – | – | Balance Sh... | Assets | Posting | |
| 10940 | Accrued Job Costs | – | – | Balance Sh... | Assets | Posting | |
| 10950 | WIP Job Costs | – | – | Balance Sh... | Assets | Posting | |
| **10990** | **TOTAL ASSETS** | 255,237.55 | 255,237.55 | Balance Sh... | Assets | End-Total | 10001..10990 |
| **20001** | **LIABILITIES** | – | – | Balance Sh... | Liabilities | Begin-Total | |
| 20100 | Accounts Payable | -51,750.97 | -51,750.97 | Balance Sh... | Current Liabilities | Posting | |
| 20200 | Purchase Discounts | – | – | Balance Sh... | Current Liabilities | Posting | |

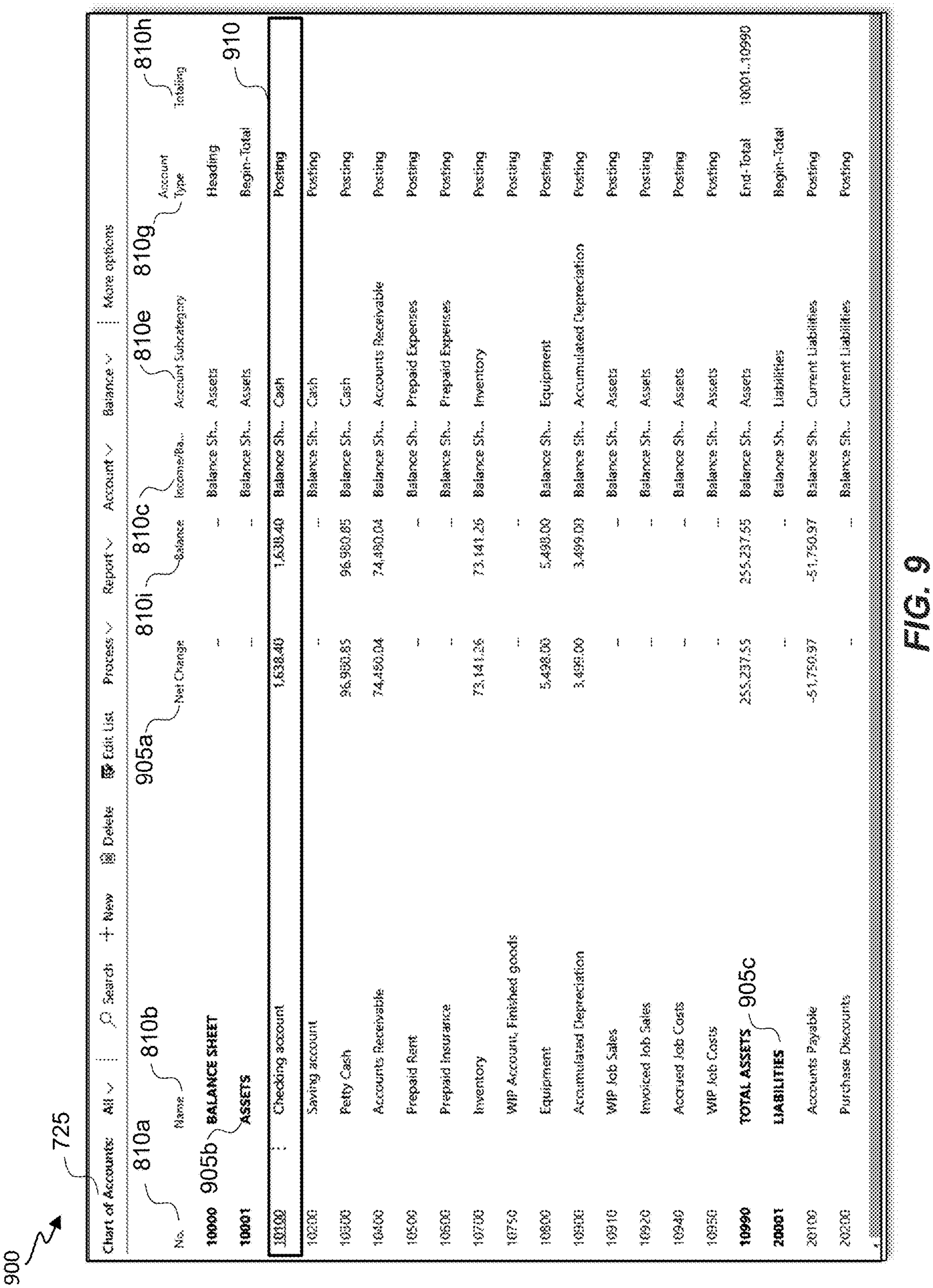

Finance Report Template Design ✓Saved

Financial Rep TESTING

1135

Generate Report... Evaluate R... | Create New Template... Open Template... Save... Save As... Update Template with AI...

General | General

Report Template | Report Template Name TESTING

Report Filters | Report Lines New Line Delete Line 235

Report Date | Budget Name | Report Lines | Line ID

| Line ID 1110 | Description 1115 | Parent 1120 | Line Display Order ↑ |
|---|---|---|---|
| 1 | Revenue | 3 | 10000 |
| 1.1 | Sales of Goods | 1 | 20000 |
| 1.2 | Sales of Resources | 1 | 30000 |
| 1.3 | Additional Revenue | 1 | 40000 |
| 1.4 | Jobs and Services | 1 | 50000 |
| 1.5 | Revenue Reductions | 1 | 60000 |
| 2 | Cost of Goods Sold (COGS) | 3 | 70000 |
| 2.1 | Cost of Goods | 2 | 80000 |
| 2.1.1 | Cost of Materials | 2.1 | 90000 |
| 2.1.2 | Cost of Materials Projects | 2.1 | 100000 |
| 2.2 | Cost of Resources and Services | 2 | 110000 |
| 2.2.1 | Cost of Labor | 2.2 | 120000 |
| 2.2.2 | Cost of Labor Projects | 2.2 | 130000 |
| 2.2.3 | Cost of Labor Warranty/Contract | 2.2 | 140000 |
| 2.3 | Subcontracted work | 2 | 150000 |
| 2.4 | Cost of Variances | 2 | 160000 |
| 2.4.1 | Purchase Variance Retail | 2.4 | 170000 |
| 2.4.2 | Material Variance | 2.4 | 180000 |
| 2.4.3 | Capacity Variance | 2.4 | 190000 |
| 2.4.4 | Subcontracted Variance | 2.4 | 200000 |
| 2.4.5 | Capacity Overhead Variance | 2.4 | 210000 |

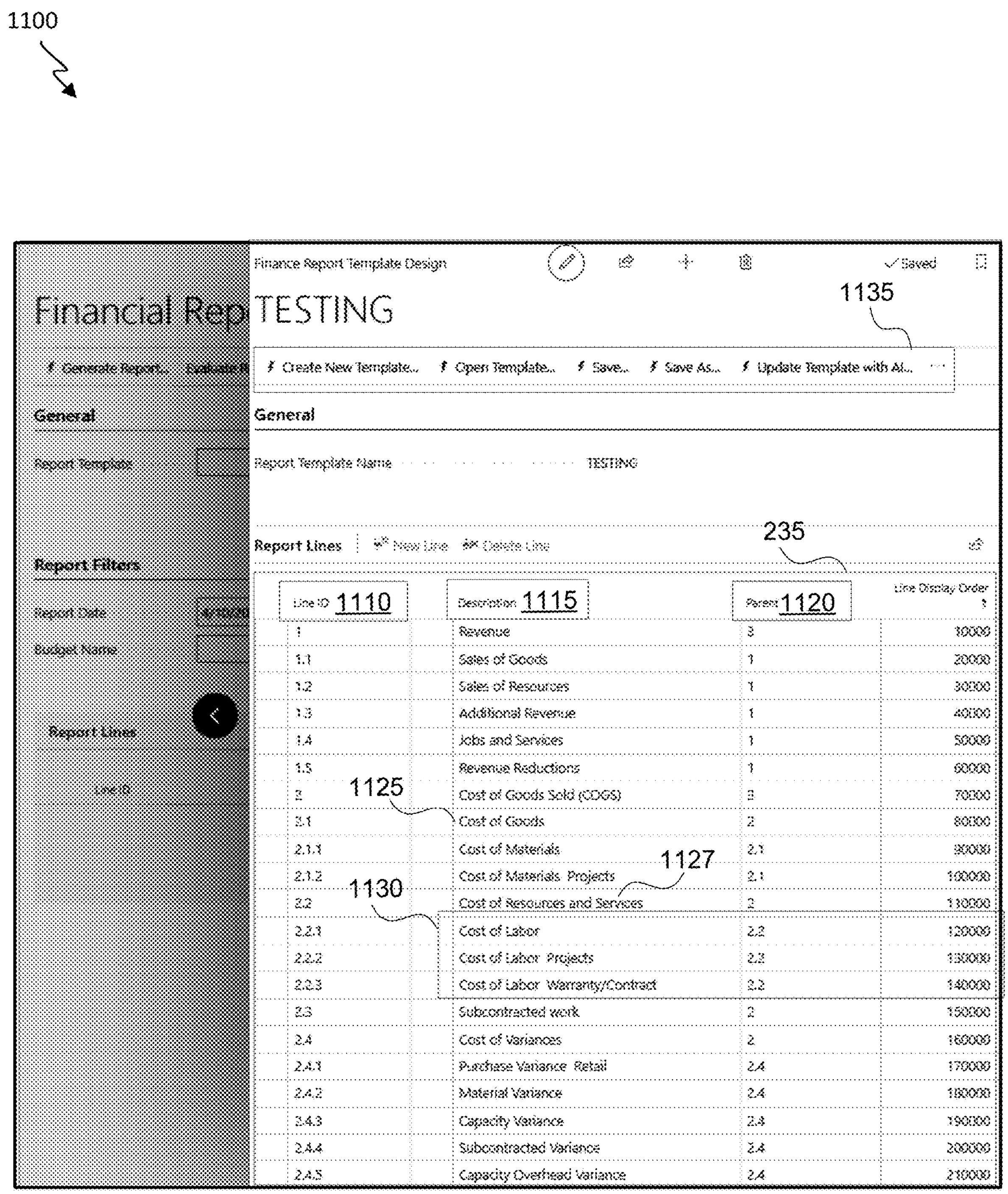

| Account Code ↑ 1210 | Account Name 1215 | Mapping to Report Line | Mapped-To Report Line Name 1220 |
|---|---|---|---|
| 44100 | Sales, Retail - North America | 1.1.1 | Sales, Retail - North America |
| 44200 | Sales, Retail - Europe | 1.1.2 | Sales, Retail - Europe |
| 44300 | Sales, Retail - Other | 1.1.3 | Sales, Retail - Other |
| 45100 | Discounts, Retail - North America | 1.2.1 | Discounts, Retail - North America |
| 45200 | Discounts, Retail - Europe | 1.2.2 | Discounts, Retail - Europe |
| 45300 | Discounts, Retail - Other | 1.2.3 | Discounts, Retail - Other |
| 52100 | COGS, Retail - North America | 2.1.1 | COGS, Retail - North America |
| 52300 | COGS, Retail - Europe | 2.1.2 | COGS, Retail - Europe |
| 52400 | COGS, Retail - Other | 2.1.3 | COGS, Retail - Other |
| 54100 | Purchases | 3.2.1 | Purchases |
| 54400 | Discounts Received | 6.1.3 | Payment Discounts Received |
| 54500 | Inventory Adjustment | 2.2.2 | Inventory Adjustment |
| 54702 | Overhead Applied | 2.3.5 | Mfg. Overhead Variance |
| 54703 | Purchase Variance | 2.2.3 | Purchase Variance |
| 54705 | Material Variance | 2.2.4 | Material Variance |
| 54707 | Mfg. Overhead Variance | 2.2.7 | Capacity Variance |
| 54710 | Capacity Cost Applied | 3.2.6 | Capacity Cost Applied |

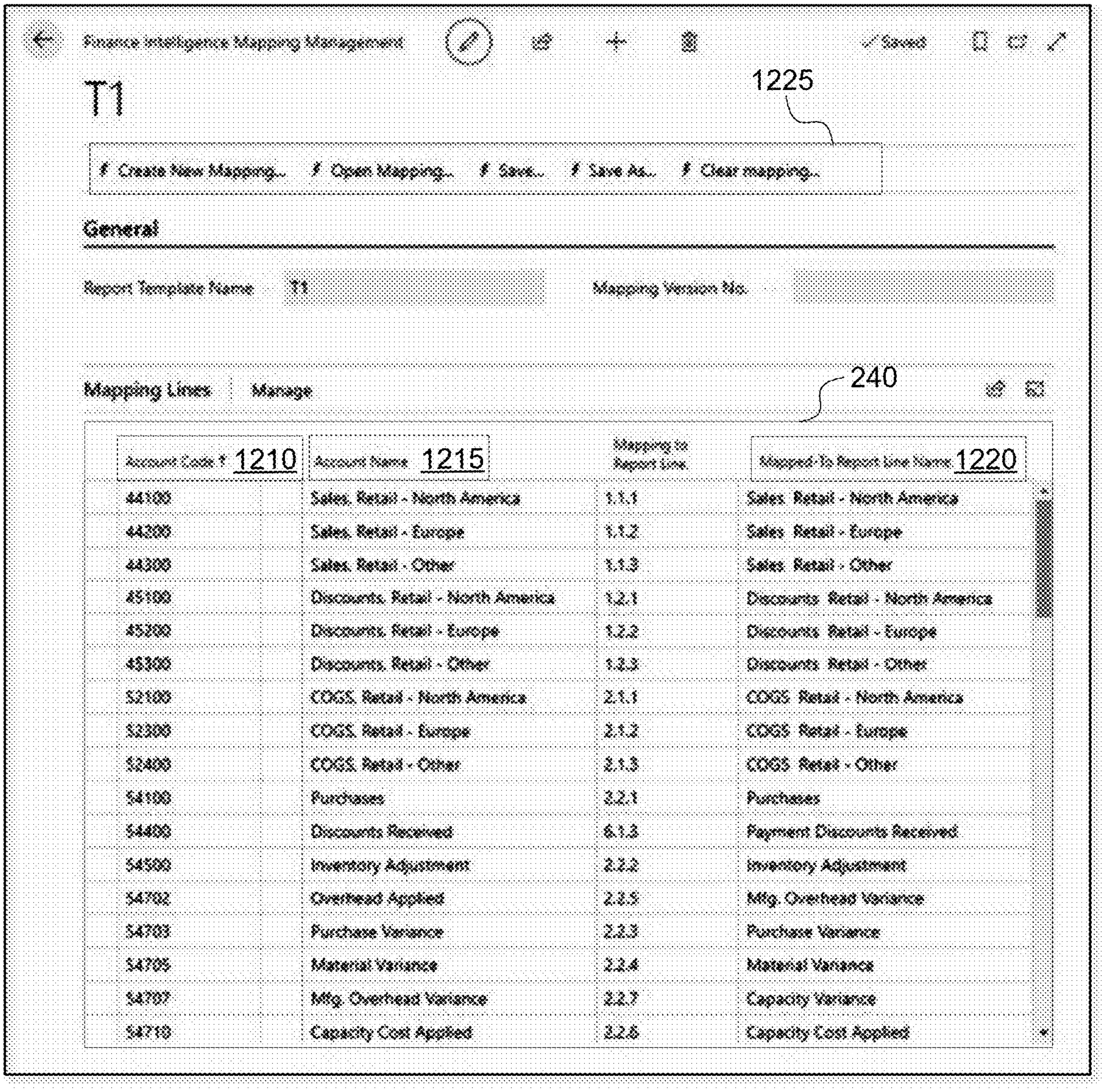

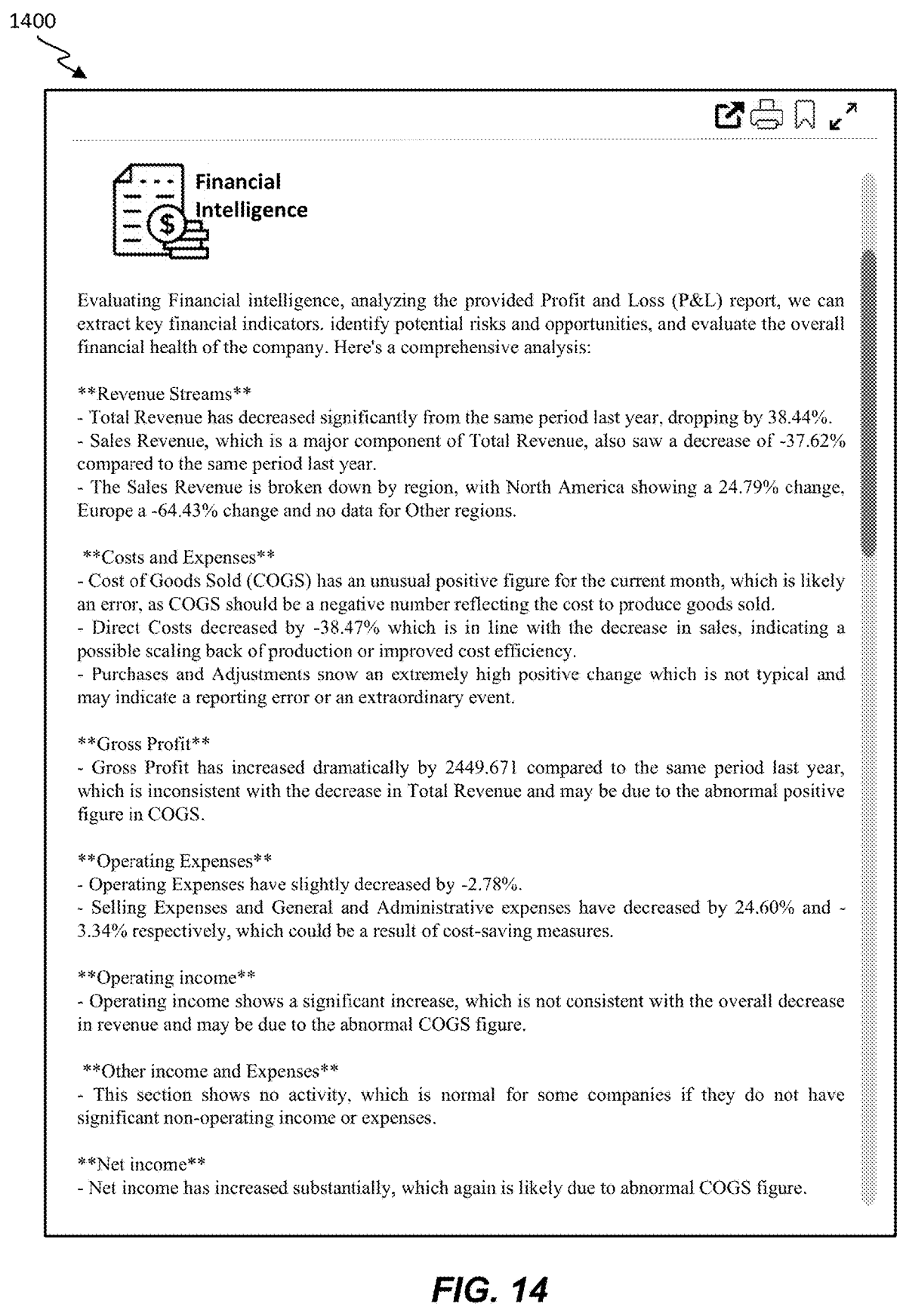

Financial Intelligence

Evaluating Financial intelligence, analyzing the provided Profit and Loss (P&L) report, we can extract key financial indicators. identify potential risks and opportunities, and evaluate the overall financial health of the company. Here's a comprehensive analysis:

Revenue Streams
- Total Revenue has decreased significantly from the same period last year, dropping by 38.44%.
- Sales Revenue, which is a major component of Total Revenue, also saw a decrease of -37.62% compared to the same period last year.
- The Sales Revenue is broken down by region, with North America showing a 24.79% change, Europe a -64.43% change and no data for Other regions.

Costs and Expenses
- Cost of Goods Sold (COGS) has an unusual positive figure for the current month, which is likely an error, as COGS should be a negative number reflecting the cost to produce goods sold.
- Direct Costs decreased by -38.47% which is in line with the decrease in sales, indicating a possible scaling back of production or improved cost efficiency.
- Purchases and Adjustments snow an extremely high positive change which is not typical and may indicate a reporting error or an extraordinary event.

Gross Profit
- Gross Profit has increased dramatically by 2449.671 compared to the same period last year, which is inconsistent with the decrease in Total Revenue and may be due to the abnormal positive figure in COGS.

Operating Expenses
- Operating Expenses have slightly decreased by -2.78%.
- Selling Expenses and General and Administrative expenses have decreased by 24.60% and -3.34% respectively, which could be a result of cost-saving measures.

Operating income
- Operating income shows a significant increase, which is not consistent with the overall decrease in revenue and may be due to the abnormal COGS figure.

Other income and Expenses
- This section shows no activity, which is normal for some companies if they do not have significant non-operating income or expenses.

Net income
- Net income has increased substantially, which again is likely due to abnormal COGS figure.

FIG. 14

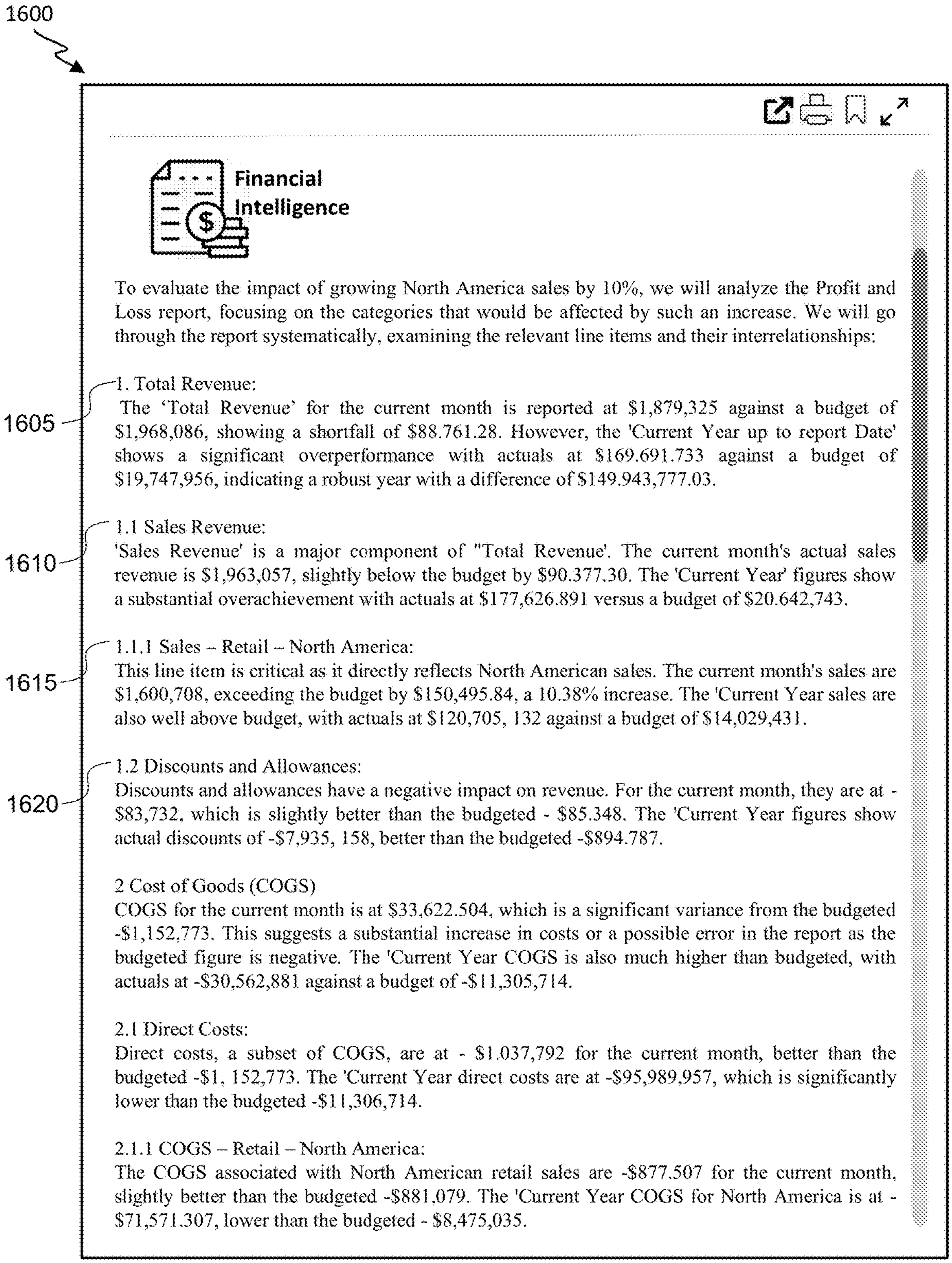

To evaluate the impact of growing North America sales by 10%, we will analyze the Profit and Loss report, focusing on the categories that would be affected by such an increase. We will go through the report systematically, examining the relevant line items and their interrelationships:

1. Total Revenue:
The 'Total Revenue' for the current month is reported at $1,879,325 against a budget of $1,968,086, showing a shortfall of $88.761.28. However, the 'Current Year up to report Date' shows a significant overperformance with actuals at $169.691.733 against a budget of $19,747,956, indicating a robust year with a difference of $149.943,777.03.

1.1 Sales Revenue:
'Sales Revenue' is a major component of "Total Revenue'. The current month's actual sales revenue is $1,963,057, slightly below the budget by $90.377.30. The 'Current Year' figures show a substantial overachievement with actuals at $177,626.891 versus a budget of $20.642,743.

1.1.1 Sales – Retail – North America:
This line item is critical as it directly reflects North American sales. The current month's sales are $1,600,708, exceeding the budget by $150,495.84, a 10.38% increase. The 'Current Year sales are also well above budget, with actuals at $120,705, 132 against a budget of $14,029,431.

1.2 Discounts and Allowances:
Discounts and allowances have a negative impact on revenue. For the current month, they are at -$83,732, which is slightly better than the budgeted - $85.348. The 'Current Year figures show actual discounts of -$7,935, 158, better than the budgeted -$894.787.

2 Cost of Goods (COGS)
COGS for the current month is at $33,622.504, which is a significant variance from the budgeted -$1,152,773. This suggests a substantial increase in costs or a possible error in the report as the budgeted figure is negative. The 'Current Year COGS is also much higher than budgeted, with actuals at -$30,562,881 against a budget of -$11,305,714.

2.1 Direct Costs:
Direct costs, a subset of COGS, are at - $1.037,792 for the current month, better than the budgeted -$1, 152,773. The 'Current Year direct costs are at -$95,989,957, which is significantly lower than the budgeted -$11,306,714.

2.1.1 COGS – Retail – North America:
The COGS associated with North American retail sales are -$877.507 for the current month, slightly better than the budgeted -$881,079. The 'Current Year COGS for North America is at -$71,571.307, lower than the budgeted - $8,475,035.

FIG. 16

ARTIFICIAL INTELLIGENCE BASED GENERATION OF FINANCIAL REPORTS AND RESPONSES IN REAL-TIME

BACKGROUND

In financial management, there is an evolution for more efficient, accurate, and intelligent solutions. Traditional methods such as Microsoft Excel® often involve manual processes that are time-consuming and prone to errors. Additionally, with the traditional methods the results may not be appropriately aggregated, summarized, synthesized, or reported in an understandable format.

SUMMARY

Described herein are one or more mechanisms for generating real-time artificial intelligence (AI)-driven financial reports and responses by leveraging enterprise intelligence. In at least one example, a computer-implemented method is provided that includes receiving financial data of a business entity from one or more data sources. The financial data may include transaction details, account information (e.g., account name, date, income or balance sheet and account category). In at least one example, a financial report template is generated that may define the structure of a financial report (e.g., profits and losses (P&L)). In at least one example, the financial report template includes a set of performance indicators that are dynamically generated, based on the financial data, by deploying a first one or more machine-learning (ML) models. In at least one example, the ML models are trained in financial accounting practices to analyze the financial data for generating a set of performance indicators or P&L indicators. These performance indicators may define a set of rules based on the financial data that an organization may require to estimate. The set of performance indicators may be different for different organizations. The focus of the P&L indicators may be to find a financial metric that may lead to net income.

In at least one example, a mapping strategy is generated that automatically links a performance indicator to a relevant financial data element of the financial data by deploying a second one or more ML models. In at least one example, based on the financial report template and the mapping strategy, a financial report is generated. In at least one example, the financial report includes a set of estimated values associated with the set of performance indicators for a specified time frame. In at least one example, the generated financial report is evaluated by applying a third one or more ML models. In at least one example, a response is generated via graphical user interface (GUI) based on the evaluation. In at least one example, the generated response includes a description of valuable insights, anomalies, and patterns in a natural language format.

In at least one example, an interactive session is provided through the GUI to ask a question in the natural language format related to the financial report. In at least one example, an answer in the natural language format is generated in real-time based on the question. In at least one example, the answer is generated by deploying one or more large language models (LLMs) that are configured to generate a response including analytics and predictions based on the evaluation of the financial report. While at least one example here is described with reference to the natural language format as English, other natural language formats include one or more of: German, Polish, French, Espanol, or Chinese.

In at least one example, the financial data is categorized by applying a fourth one or more machine-learning models that group the financial data into categories and subcategories based on account information.

In at least one example, the AI-generated financial report template is customized by adding one or more new performance indicators. In at least one example, a performance indicator of the one or more new performance indicators is added to the report template by inputting, via the GUI, a brief description in the natural language format from a user. A natural language processing may be deployed to extract a meaningful performance indicator from the brief description. In at least one example, the financial report template is customized by deleting one or more performance indicators of the set of performance indicators via the GUI. In at least one example, the customized financial report template is stored into a database for version control that helps in tailoring P&L statements.

In at least one example, determining that the performance indicator of the set of performance indicators in the mapping strategy is not correctly mapped to the relevant financial data element of the financial data. Based on the determination, a different financial element from the financial data is mapped to the performance indicator of the set of performance indicators in the mapping strategy. In at least one example, the updated mapping strategy is stored into a database.

In at least one example, one or more financial documents are received that comprise the financial data of the business entity. In at least one example, a financial document of the one or more financial documents includes one or more of: an invoice, a receipt, a bank statement, or a purchase order. In at least one example, the financial data is extracted by applying natural language processing to interpret unstructured data within the financial document of the one or more financial documents.

In at least one example, a computer-program product tangibly embodied in a non-transitory machine-readable storage medium, including instructions configured to cause one or more data processors to perform part or all of one or more methods or processes disclosed herein.

In at least one example, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF DRAWINGS

The examples will be understood more fully from the detailed description given below and from the accompanying drawings, which, however, should not be taken to limit the disclosure to the specific examples, but are for explanation and understanding only.

FIG. 9 is a screenshot of a user interface displaying a list of G/L accounts as "chart of accounts," in accordance with at least one example.

FIG. 11 is a screenshot of an AI-generated "Financial Report Template Design" user interface, in accordance with at least one example.

FIG. 12 is a screenshot of an AI-generated "Financial Intelligence Mapping Management" user interface, in accordance with at least one example.

FIG. 14 is a screenshot displaying a user interface showing an AI-generated evaluation of a P&L statement, in accordance with at least one example.

FIG. 16 is a screenshot displaying a user interface of an AI-generated response of the P&L related question, in accordance with at least one example.

DETAILED DESCRIPTION

Figure 1:
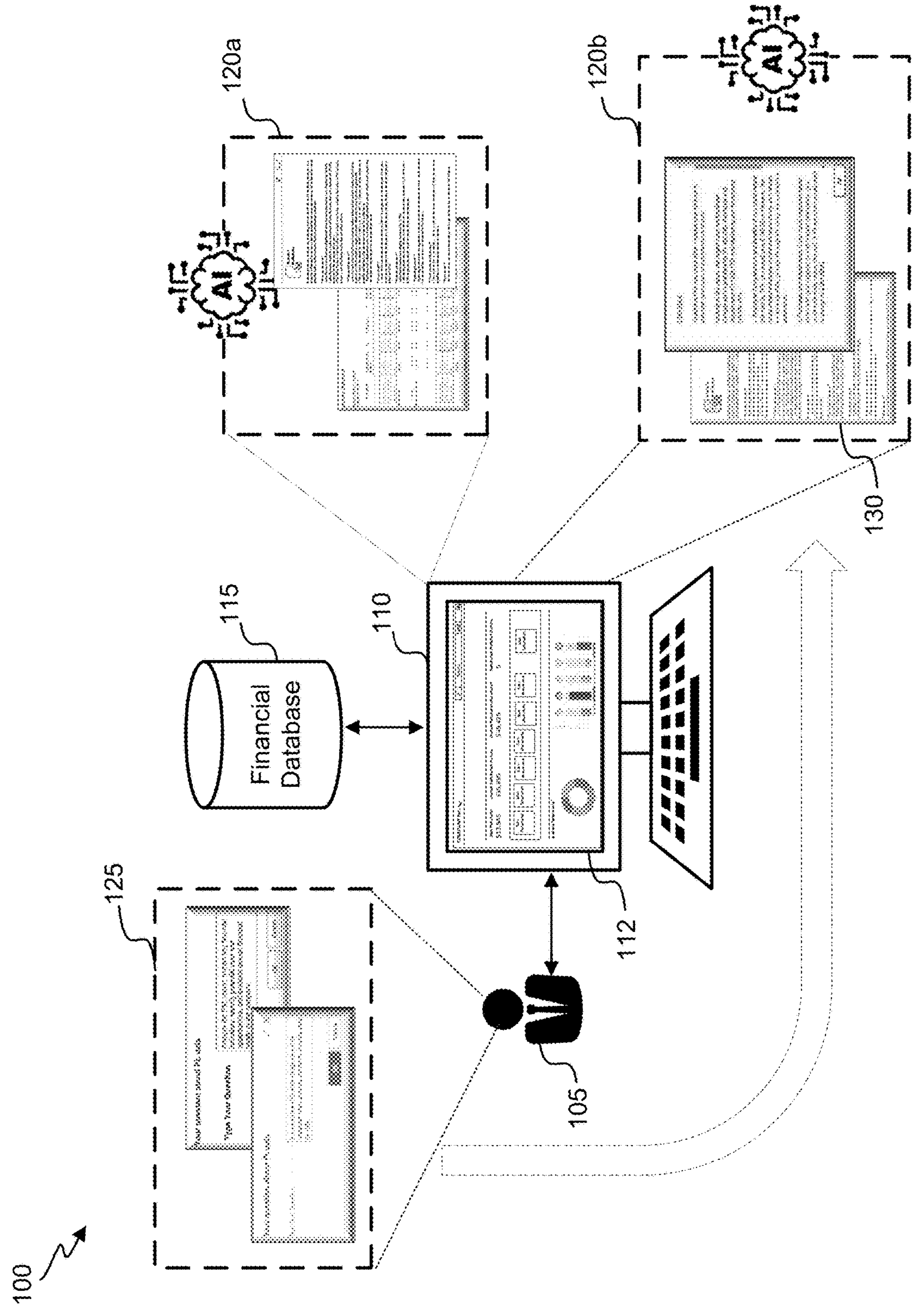
FIG. 1 is a schematic of a system for generating real-time artificial intelligence (AI)-driven financial reports and responses, according to at least one example.

At least one example is directed, in part, to a real-time generation of artificial intelligence (AI)-driven financial reports and responses based on the provided financial data for a business entity. In at least one example, the AI-driven financial reporting solution leverages advanced algorithms to streamline and enhance financial reporting processes. In at least one example, machine-learning (ML) techniques are deployed to analyze large amounts of financial data, providing accurate insights and predictions. In at least one example, automated AI-driven reporting features are provided that enable the businesses to generate real-time reports (profit and loss (P&L) statements). In at least one example, the reports are evaluated to produce a description of summary, predictions, insights and/or analysis of the financial data in a natural language format via a graphical user interface (GUI). The AI-driven capabilities help in detecting patterns, anomalies, and trends within the financial data, facilitating more informed strategic planning for organizations. In at least one example, an interactive session is provided to a user to ask questions related to the generated financial reports in a natural language format. In at least one example, a real-time AI-driven response is generated in the natural language format answering the question.

The term "business intelligence" (BI) or "enterprise intelligence" may generally refer to use of business analytics and intelligence at the organizational or enterprise level. It involves collecting, analyzing, and interpreting data from one or more sources within a business entity to make informed decisions. Business intelligence performs activities may include data mining, reporting, performance management and other financial activities. A business intelligent solution (BIS) is a unified business management solution and/or enterprise resource planning (ERP) system that may or may not integrate cloud computing environment. Such a system may encompass a comprehensive set of tools, technologies, and processes designed to facilitate financial data analysis, reporting, making informed decisions, and improving overall efficiency of a business entity.

Business intelligence can help organizations manage financials, sales, services, and operations from a single platform. It may also offer features such as accounting, inventory management, human resource management, supply chain management (SCM), project management and the like. Implementing an AI-driven financial reporting and analytics solution in business management may have a significance for several reasons. It may enhance accuracy and efficiency by automating data analysis, reducing errors, and providing real-time insights. This may allow businesses to make informed decisions accordingly. AI-driven solutions can handle large volumes of financial data more effectively than the traditional methods. For example, traditional methods may involve manual processing such as data entry, spreadsheet-based calculations, and manual analysis of financial reports. These methods may be time-consuming, prone to errors, and may not effectively handle large voluminous data.

The automation of financial reporting through AI may not just reduce time significantly but also reduces the effort required to generate P&L statements. While traditional financial reporting and analysis is performed by various individuals using workbooks and/or spreadsheets (e.g., Microsoft Excel®) that may take a significant number of resources and are prone to errors. Human-intensive processes can also be a bottleneck for timely and precise generation of financial reports. The obstruction may be further augmented as the business grows and deals with increasingly complex financial data. In such scenarios, the potential of errors, delays in data consolidations and limitations in the ability to quickly adapt to the changing financial landscape may also be evident. In at least one example, the system promptly generates AI-based reports in real-time resulting in immediate access to financial insights and eliminating the probability of human errors. This may allow the human resources to save time and focus on more strategic tasks.

The disclosed tool may offer many other technical advantages. The provision of analysis reports in human understandable format may enhance communication and understanding for users who may not have strong financial understanding. In at least one example, the AI algorithms are trained on large amounts of financial data to detect anomalies and irregularities within the business entity. The deployment of such trained AI models may help early prediction of potential issues, reducing risks of errors or fraudulent activities. In at least one example, the disclosed system provides a unified platform to manage multiple organizations simultaneously. This may enable the users (or clients) to access and manage data, settings, activities, and operations for multiple companies from a single interface.

In at least one example, the system further allows customization of P&L statements using AI in speedy manner (e.g., a matter of seconds or less than a minute). In at least one example, the P&L statements are effortlessly tailored through user-friendly interfaces. Customized generation can be automated by utilizing AI-generated financial report template and mapping strategy. In at least one example, clients can create templates according to their reporting needs and preferences using AI-based features. In at least one example, the system populates the generated templates by designing a mapping strategy through AI with the updated and relevant financial data. Customization may often use version control. In at least one example, the disclosed tool provides version control for storing different versions of P&L statements. This feature may allow the user to maintain a historical record of P&L statements over time offering historical tracking, scenario analysis, comparative analysis, budgeting, and forecasting. In case of errors or discrepancies, version control may enable rollback functionality. In at least one example, the system supports the capability of asking questions in any language. This multilingual support may remove the language barrier, enabling enhanced user engagement by accommodating diverse users.

FIG. 1 is a schematic of a system 100 for generating artificial intelligence (AI)-driven financial reports and responses, according to at least one example. In at least one example, system 100 includes one or more clients or users 105, a computing device 110, and a financial database 115 including financial data. One or more clients or users 105 from a business organization may use the disclosed tool on computing device 110, via a graphical user interface (GUI) 112, to generate AI-driven outputs (e.g., financial reports 120*a*) and responses 120*b*. In at least one example, one or more clients or users 105 input the financial data manually through GUI 112, and/or import from a financial database 115. The financial data generally incorporates various financial elements for analysis and reporting of the health of an organization, for example, revenue, liabilities, expenses, profits, taxes, assets, cash flows and other related financial attributes. In at least one example, financial database 115 may include various sources such as an ERP system (e.g., Oracle®, Microsoft dynamics or SAP®), spreadsheets (e.g., Excel), direct connections to databases (e.g., SQL server, MySQL®, Oracle®), clouds (e.g., Google®, AWS® or Azure®), comma-separated value (CSV) or text files or other external sources. In at least one example, system 100 processes the collected financial data, thereby generating instantly and accurately AI-driven financial reports 120*a* (e.g., P&L statements) and responses 120*b*.

In at least one example, financial reports 120*a* comprises various profit and loss (P&L) or performance indicators that are dynamically generated by leveraging AI techniques that analyze the financial data. These P&L indicators may be different for different organizations depending upon the provided financial data. In at least one example, system 100 provides a tool for generating AI-driven reports 120*a* automatically, making the process swift, accurate, and user-friendly. In at least one example, the tool is integrated with a BIS for creating financial reports 120*a*. In at least one example, a user-friendly interface is provided, enabling users to navigate and utilize the tool effectively. In at least one example, the tool integrates AI capabilities by leveraging AI algorithms to automate the P&L statement generation process.

In at least one example, system 100 evaluates the generated AI-driven financial reports 120*a* and provides valuable insights by analyzing generated reports 120. In at least one example, system 100 introduces an interactive dimension that enables one or more clients or users 105 to ask questions 125 and receive intelligent, data-driven answers and responses 120*b*. This transformative feature enables businesses to not only analyze financial reports 120*a* with accuracy but also engage in dynamic, interactive decision-making. With AI-driven insights and real-time question answers (Q&A) 125, system 100 helps propel businesses towards proactive and informed financial strategies.

Figure 2:
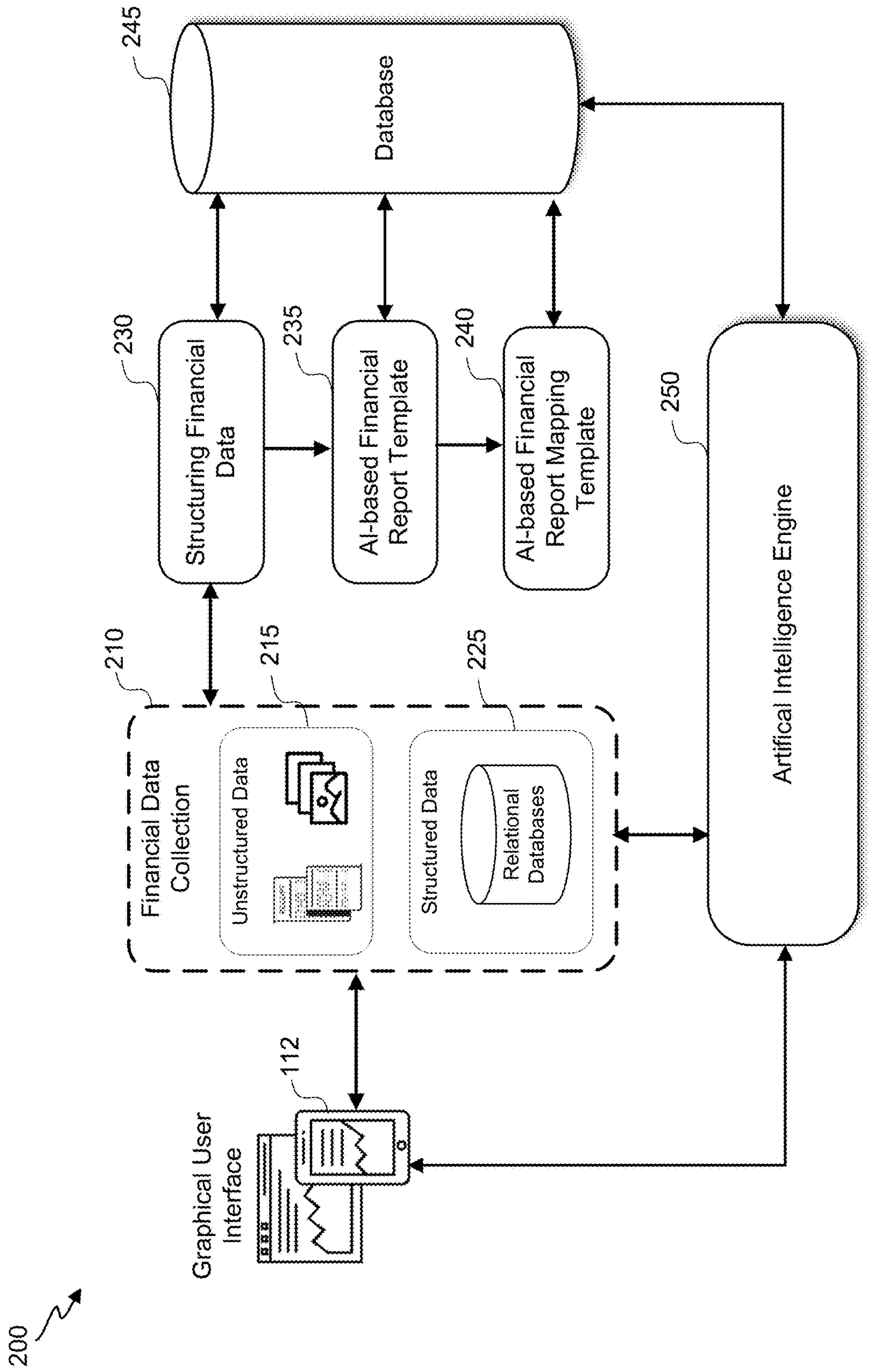
FIG. 2 is a schematic of one or more components of the system that generates real-time AI-driven financial reports and responses, in accordance with at least one example.

FIG. 2 is a schematic of one or more components of system 100 that generates AI-driven financial reports and responses in real-time, in accordance with at least one example. In at least one example, system 200 performs financial data collection 210, via GUI 112, from various sources in various formats. In at least one example, financial data is structured data 225 (e.g., tabular data from relational databases with clearly defined rows and columns such as Excel spreadsheets, SQL tables, CSV) or unstructured data 215 (e.g., textual data from sources such as emails, images from scanned documents or financial reports).

In at least one example, the system performs structuring of the financial data that is collected from various sources. The structuring of financial data 230 may include transformation, extraction/identification, categorization, and organizing. In at least one example, for unstructured data 215, e.g., documents scanned or uploaded into the system, structuring of financial data 230 involves leveraging optical character recognition (OCR) technology for transforming images into textual data. In at least one example, one or more clients or users 105 upload or feed financial documents that include invoices, receipts, contracts, bank statements, or other financial paperwork or electronic files. In at least one example, OCR is applied to transform scanned or image-based text into machine-readable and editable text. This technology may recognize characters, numbers, and symbols from the specified document. In at least one example, transformed data from OCR is fed into data extraction/identification algorithms that identify and extract relevant financial data (e.g., amounts, dates, transaction details and relevant identifiers such as predefined categories) from the converted text.

In at least one example, data extraction algorithms may include rule-based algorithms that use predefined patterns or rules for identifying and extracting specific data points. For instance, a rule might be defined for identifying invoice amounts with a specific format or location within the document. Other text-based extraction algorithms include natural language processing (NLP), machine-learning (ML) models, fuzzy matching algorithms, or a combination thereof. In at least one example, for structuring of financial data 230, regularization techniques are used on the extracted financial data for standardization. For instance, converting diverse data format such as currency or date to a respective single format. In at least one example, the standardized financial data is structured hierarchically into predefined categories, where categories are at a higher level and subcategories provide more granularity. For example, "Asset Account" is a predefined category and "Checking Account," and "Saving Account" are the subcategories. In at least one example, subcategories are not predefined.

In at least one example, this hierarchical arrangement is defined manually while entering the account information. In at least one example, hierarchical arrangement is performed automatically. In at least one example, the automated categorization is performed using one or more ML models to identify groups and subgroups. In this instance, a learning model is generated from a corpus of training data that includes a large number of sentences, words, and terminologies associated with business intelligence. In at least one example, for textual data, the financial data is preprocessed using natural language processing. For example, word2vec, words embedding or bi-directional encoder representation (BERT) that captures the semantic and context from text and generates embeddings. In at least one example, embedded vectors are passed to one or more ML models that include supervised (such as neural networks, long short-term memory (LSTM), support vector machines or decision trees trained on labeled data to predict the category and subcategory for extracted financial data) or unsupervised techniques such as clustering-based algorithms.

In at least one example, once the data is transformed and structured, the data is stored in database 245 or designated repository for centralized access. In at least one example, structured data may be integrated into existing data within the BIS for a complete view and consistency in reporting. The solution may also provide automated features to schedule regular updates and imports from the specified documents or spreadsheets, in accordance with at least one example.

In at least one example, an AI-based financial report template 235 is created in real-time by applying one or more ML techniques. In at least one example, AI-based financial report template 235 includes a list of financial metrics, with a focus on generating profit and loss (P&L) statements that primarily include net profits and losses. In at least one example, for the designing of AI-based financial report template 235, one or more ML techniques analyze the structured financial data. In at least one example, one or more ML techniques identify financial metrics, also termed as P&L indicators, that contribute to the performance of an organization. In at least one example, ML techniques can identify P&L indicators (e.g., revenue, expense, net income, profit margins) through various methods. In at least one example, an ML model is trained on accounting practices and historical financial data to identify patterns and trends that affect the financial productivity of an organization.

In at least one example, ML models automatically select features or variables that are most relevant in prediction of financial outcomes to identify various performance indicators. Such models apply predictive modeling to identify leading indicators that strongly correlate with financial performance, in accordance with at least one example. In at least one example, ML regression models and clustering analysis highlight the relationship between variables, aiding in the identification of key drivers affecting financial outcomes. In at least one example, the ML models are trained in financial accounting practices to analyze the financial data for generating a set of performance indicators or P&L indicators. In at least one example, the set of performance indicators defines a set of rules based on the financial data that an organization uses to estimate P&L. In at least one example, the set of performance indicators are different for different organizations. In at least one example, the focus of the P&L indicators is to find a financial metric that leads to net income. In at least one example, AI-based financial report template 235 is stored in database 245 for further processing and versions control.

In at least one example, AI-based financial report template 235 is customized by adding or deleting financial metrics in accordance with unique requirements of the business entity. In at least one example, GUI 112 is provided that allows one or more clients or users 105 to interact, modify, and customize AI-based financial report template 235. For adding a financial metric, a brief description may be provided through GUI 112. In at least one example, the description is analyzed by applying an NLP model for extracting the specified financial metric within the description. In at least one example, the updated or customized AI-based financial report template 235 is stored in database 245 for version control and further processing. This way different versions of AI-based financial report template 235 may be stored for generating customized financial reports **120*a***.

In at least one example, financial report mapping template 240 is generated in real-time using AI-based techniques. In at least one example, one or more ML models generate a mapping between the identified P&L indicators and the corresponding financial data element from the structured financial dataset. This mapping may enable each P&L indicator to be associated with appropriate financial data element (e.g., account) for calculation. In at least one example, the mapped financial data is integrated in financial report mapping template 240 based on the established association. In at least one example, system 200 may include quality checks and validations to enable accuracy and consistency of financial report mapping template 240. In at least one example, financial report mapping template 240 is validated to confirm each P&L indicator is mapped to relevant financial data. If an indication is received that the mapping is not correct, mapping of financial report mapping template 240 is modified. In at least one example, a different financial data element from the structured financial data is selected in the designated input data fields through GUI 112. In at least one example, the validated financial report mapping template 240 is stored into database 245 for further processing and version control. Storing the updated AI-based financial report template 235 and the corresponding financial report mapping template 240 may enable accessing multiple versions of financial reports **120*a***.

In at least one example, system 200 includes an AI engine 250 that takes generated financial report template 235 and financial report mapping template 240 from database 245 and generates financial reports **120*a* (including P&L statements). In at least one example, financial reports 120*a* (can also be termed as an income statement) may show the net revenue, costs, and/or expenses incurred during a specific time period. In at least one example, AI engine 250 analyzes financial reports 120*a* to understand the content and statistics of financial reports 120*a*. In at least one example, system 200 evaluates financial report template 235 through AI engine 250, thereby generating an analysis report that includes a description of insights, summary, anomalies, common trends, and/or patterns in a natural language format. In at least one example, AI engine 250** may deploy ML techniques, trained on historical financial data, configured to highlight anomalies (e.g., spikes in expenses, drops in sales, or unusual pattern from expected patterns in financial data).

In at least one example, AI engine 250 deploys one or more large language model (LLM) such as BERT, generative pre-trained transformer (GPT). These pre-trained models can be fine-tuned for financial tasks such as analysis and reporting. In at least one example, one or more LLMs are trained on a range of historical labeled in financial reports 120*a* (e.g., P&L statements) from different industries and organizations with relevant performance indicators and insights or summaries. For example, a training data sample including performance indicators for a company are: "net sale: $300,000," "net revenue: $1,300,000," and "operating cost: $700,000" and insights or summary is: "The company generated $1.3 million in revenue with $700,000 in operating cost, resulting in a net sale of $300,000." During training, LLMs learn to understand the context of the statements and generate meaningful summaries and insights related to specified performance indicators. In at least one example, AI engine 250 utilizes trained ML models for recognizing patterns such as growth consistency over a period of time, recurring cycles or seasonality in various financial metrics. Based on the detected anomalies and identified patterns, AI engine 250 extracts meaningful insights, for example, identifying specific financial entities or events that contribute to unusual points. In at least one example, AI engine 250 provides concise summaries of the financial performance using LLMs or transformer models that capture the contextual information.

In at least one example, system 200 acts as a financial conversationalist by providing the ability to engage with financial data in real-time, ask questions (here, user queries 125) and receive answers 130 through GUI 112 in a natural language format. This provides transformation of financial static analysis to a dynamic, interactive experience. In at least one example, AI engine 250 interprets user queries 125 by implementing one or more ML techniques such as LLMs and NLP techniques that can understand intent behind user queries 125 related to financial data or financial reports **120*a***. In at least one example, the disclosed tool provides a dynamic and interactive dimension to decision-making, providing intelligent and data-driven answers by leveraging AI. In at least one example, the tool deploys one or more LLMs such as BERT or its variants. In at least one example, LLMs are fine-tuned on a corpus of training data that comprises a large number of labeled data (Q&A) associated with business intelligence (BI).

In at least one example, LLMs are trained to understand the context and relationships between questions 125 and answers 130 specific to financial reports **120*a*. In at least one example, an interactive interface is implemented that enables one or more clients or users 105 to user queries 125 in natural language about P&L. In at least one example, fine-tuned LLMs generates answers 130 considering the context based on user queries 125**. For example, a training data sample with Q&A pair can be: "question: What steps the company should take to increase profitability?," "answer: To enhance profitability, the company could consider optimizing expenses by 5% and implementing marking strategies to reach out more customers."

In at least one example, the system supports the capability of asking questions in any language. This multilingual support may remove the language barrier, enabling enhanced user engagement by accommodating diverse users. In at least one example, the training data is expanded to include P&L related Q&A pairs in multiple languages. In at least one example, the tool deploys LLMs such as mBERT (multilingual BERT) or XLM-R (Cross-lingual language model representations) that are designed for generation and understanding of text in multiple languages. In at least one example, these LLMs are fine-tuned on expanded training dataset. In at least one example, the system implements a mechanism for language detection to identify that which language is used for user queries 125. Multilingual support can also be provided by considering translation models that take user queries 125 in a user-specified format and translate it to a language format on which the model is trained.

In at least one example, system 200 provides storage and management of multiple versions of P&L statements in database 245, thereby offering adaptation to evolving business requirements without hassle. In at least one example, system 200 is designed to keep track of changes, updates, or different iterations of financial statements over time. In at least one example, system 200 is configurable to facilitate easy adaptation to changing business needs. This could enable users to adjust the P&L statements as the business evolves, and the system handles these changes seamlessly.

Figure 3:
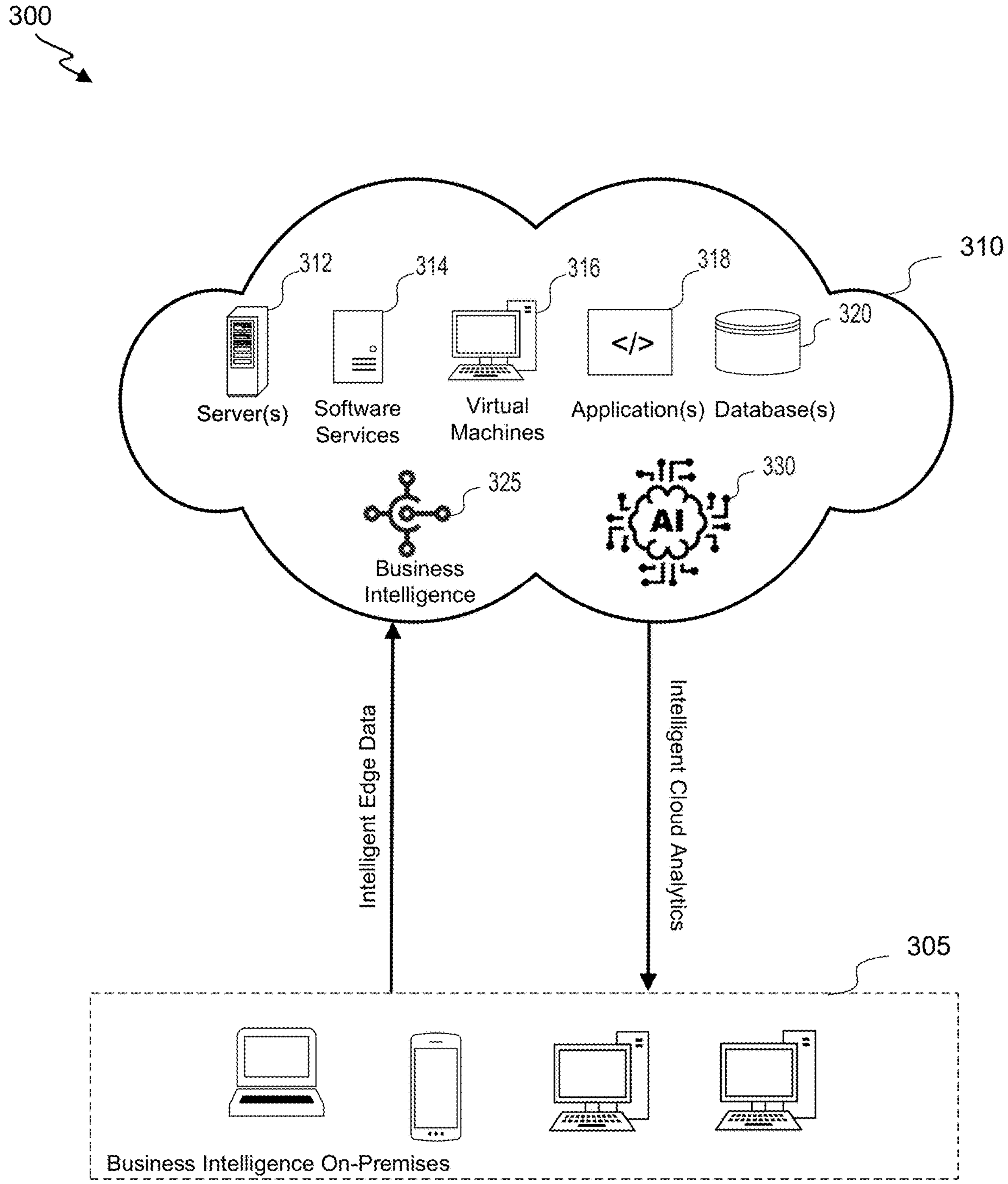
FIG. 3 is a schematic of an environment for an integration of the disclosed system with an intelligent cloud, in accordance with at least one example.

FIG. 3 is a schematic of an environment for integration of system 200 with a cloud 310, in accordance with at least one example. In at least one example, system 200 is run as software as a service (SaaS). In at least one example, the tool that generates real-time AI-generated responses **120*b* and financial reports 120*a* is integrated with a business intelligence (BI) solution. In at least one example, environment 300 includes an integration of cloud 310 with an on-premises BI solution 305 with multiple clients. This integration may involve connecting and leveraging cloud-based services to enhance the capabilities of existing on-premises BI solution 305. Here, on-premises BI solution 305 may refer to a BI solution that is installed, operated, and maintained within the physical premises or infrastructure of an organization in contrast to a cloud-based BI solution. For integration of data on cloud 310, secure connections and protocols may be established for the present tool, for example, setting up application programming interface (APIs) and connectors or data transfer mechanisms. In at least one example, BI solution 305 can access cloud 310 through a communication network for sending intelligent edge data and receiving intelligent cloud analytics. In at least one example, BI solution 305** solution can utilize cloud-based AI enabling cloud-based analytics and ML services for enhanced analytical capabilities of the BI system. This may involve running advanced analytics, predictive modeling or generating insights using cloud-based tools.

In at least one example, one or more clients or users 105 login using a web browser, computing device 110 (e.g., phone or tablet), or through API to access the application. Cloud 310 may be termed as an intelligent cloud providing AI-based cloud application(s) 318 or software services 314. Within cloud 310, software services 314 may encompass a range of functionalities that may include middleware, data processing, and application services. These services 314 may facilitate seamless communication and collaboration among various components of cloud 310. In at least one example, cloud 310 may host database(s) 320 that store and manage data efficiently. One or more servers 312 in cloud 310 may provide computing power to run application(s) 318, services 314, and processes. In at least one example, server(s) 312 may also contribute to the scalability and responsiveness of the cloud environment.

Virtual machines 316 in cloud 310 may offer scalable and flexible computing resources that can be used for multiple clients or customers. The deployment of virtual machines 316 may enable optimization in resources utilization. The cloud applications or web applications 318 may provide a user-friendly interface to access and interact with various services within the cloud environment. An AI module 330 within cloud 310 may offer enhanced capabilities. In at least one example, cloud 310 may offer intelligent cloud analytics, insights generation and decision-making processes using trained models. In at least one example, BI solution 305 (e.g., a central solution) can take advantage of cloud-based applications through intelligent cloud 310. In at least one example, each BI solution 305 that connects to cloud 310 may be able to replicate data from on-premises to the cloud tenant. In at least one example, one or more clients or users 105 can leverage cloud 310 for financial data, AI, and/or ML.

Figure 4:
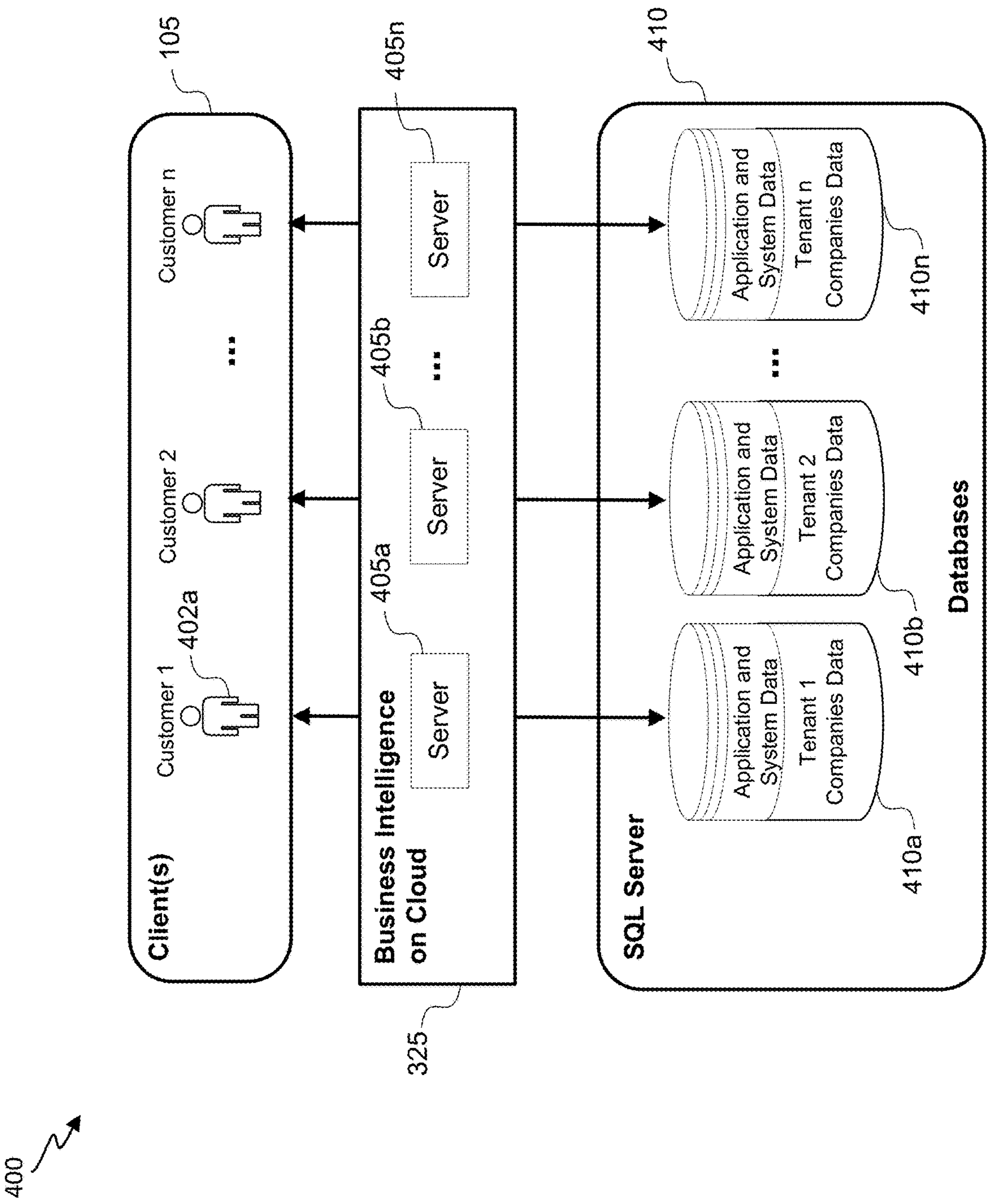
FIG. 4 is a schematic of a cloud deployment model in which some examples may be practiced, in accordance with at least one example.

FIG. 4 is a schematic of a cloud deployment model, in accordance with at least one example. Here, one or more clients or users 105 refer to a business entity or a group of legal entities. In at least one example, system 400 includes one or more clients or users 105 to interact with the cloud-based business intelligence solution (BIS) 325. It should be appreciated that system 400 depicted in FIG. 4 may have other components than those depicted. FIG. 4 illustrates one example of the system. In at least one example, system 400 may have more or fewer components than shown in FIG. 4, may combine two or more components, or may have a different configuration or arrangement of components.

One or more clients or users 105 may interact with a cloud-based BIS 325 by configuring a client application e.g., a web browser, a desktop, or a mobile application. One or more clients or users 105 may communicate with BI servers e.g., 405*a*, 405*b* . . . 405*n* which are hosted in cloud 310. In response, BI server(s) 405*a* may manage the business logic, process requests, and interact with the database. In at least one example, cloud-based BIS 325 may utilize a database management system (DBMS) such as database 410 (e.g., SQL server database) that is responsible for storing and managing the underlying data of one or more clients or users 105, including financial transactions, inventory details, customer information and the like. When one or more clients or users 105 perform actions via BI server(s) 405 client application (e.g., creating a sales order, updating inventory, or saving a financial report), BI server 405 may process these actions. Business logic may be applied to enable data consistency and to perform necessary calculations. The processed data may be stored in database 410 (e.g., SQL server database) and accessed through an instance of server 405. Each module in BIS 325 (e.g., finance, sales, reporting) may have a corresponding table in SQL database to organize and store data.

An external solution, such as described in at least one example, can be integrated with BIS using application program interfaces (APIs). These integration points may allow the reporting tool to request specific data or perform actions within BIS, in accordance with at least one example. In at least one example, if a BIS is deployed in a cloud, SQL server database 410 may also be hosted in cloud 310. This deployment may enhance scalability, accessibility, and the benefits of cloud computing. A BIS may include an application (e.g., the code) and business data (e.g., the client's data). In at least one example, there can be two ways to deploy a BIS on cloud 310. In at least one example, BIS can be installed as a single-tenant deployment by default. In a single-tenant deployment, the application and the business data are stored in the same database. Each customer solution has its own business central server and database, as illustrated in FIG. 4. For example, a client 402*a* has a dedicated BI server 405*a* on cloud, and one SQL database 410*a*, where application and business data of a tenant company are stored together. In a multitenant deployment, the application and business data are stored in separate databases, in accordance with at least one example. In at least one example, there is a single BI server 405 and a single application database for multiple customers. In at least one example, each individual customer has an individual proprietary database for storing business data.

Figure 5:
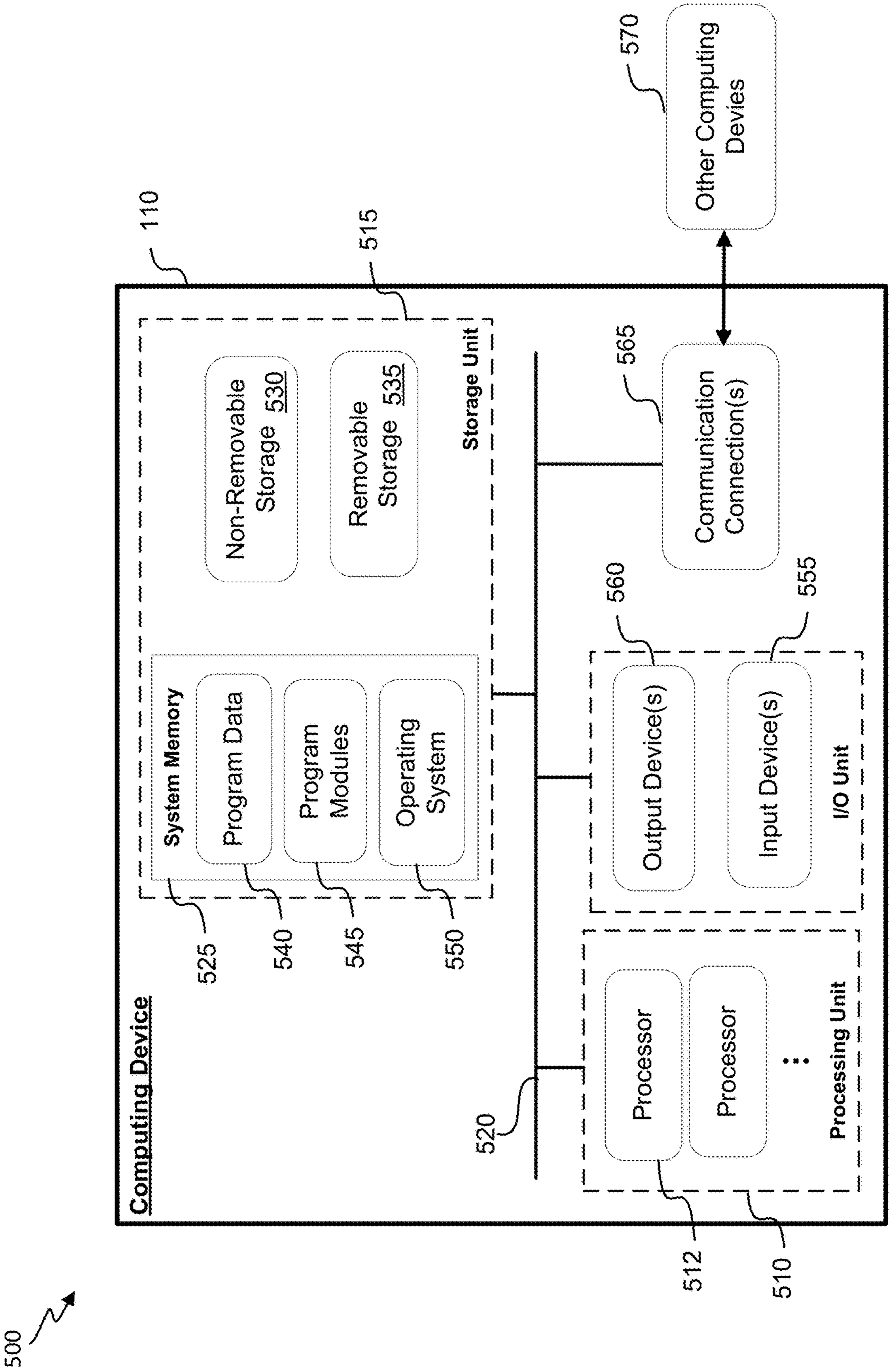
FIG. 5 is a schematic of a computing system that performs real-time business intelligent financial reporting, in accordance with at least one example.

FIG. 5 is a schematic of a computing system 500 that performs real-time business intelligent reporting of financial reports 120*a*, in accordance with at least one example. In at least one example, the functionality described herein can be performed, at least in part, by one or more hardware logic components. For example, and without limitation, illustrative types of hardware logic components that can be used include field-programmable gate arrays (FPGAs), application-specific integrated circuits (ASICs), application specific standard products (ASSPs), system-on-a-chip systems (SOCs), complex programmable logic devices (CPLDs), etc., where analog, digital, and/or mixed signal and other functionality can be implemented in a substrate.

To provide additional context for various aspects thereof, FIG. 5 and the following description are intended to provide a brief, general description of the suitable computer system 500 in which the various aspects can be implemented. While the description above is in the general context of computer-executable instructions that can run on one or more computers, those skilled in the art will recognize that a novel implementation also can be realized in combination with other program modules and/or as a combination of hardware and software. Computer system 500 for implementing various aspects includes computing device 110 that further includes a processing unit 510 having processor(s) 512 (also referred to as microprocessors), a computer-readable storage medium (where the medium is any physical device or material on which data can be electronically and/or optically stored and retrieved) such as a storage unit 515 (computer readable storage medium/media also include magnetic disks, optical disks, solid state drives, external memory systems, and flash memory drives), and a system bus 520. In at least one example, processing unit 510 can be any of various commercially available microprocessors such as single-processor, multi-processor, single-core units, and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be cooperatively coupled to one or more associated devices.

In at least one example, computing device 505 can be one of several computers employed in a datacenter and/or computing resources (hard-ware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a so service and APIs (application program interlaces) as a service, for example. In at least one example, system memory 525 can include computer-readable storage (physical storage) medium such as a volatile memory (e.g. random-access memory (RAM)) and a non-volatile memory (e.g., (ROM). A basic Input/output system (BIOS) can be stored in the non-volatile memory and includes the basic routines that facilitate the communication of data and signals between components within computing device 505, such as during startup. The volatile memory also includes a high-speed RAM such as static RAM for caching data.

In at least one example, computing device 505 may have additional features or functionality. For example, computing device 505 may also include additional data storage devices (removable and/or non-removable) such as, for example, magnetic disks, optical disks, or tape. Such additional storage is illustrated in FIG. 5 by removable storage 535 and non-removable storage 530. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data.

In at least one example, system memory 525, removable storage 535, and non-removable storage 530 are all examples of computer storage media, comprising storage unit 515. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by computing device 505. Any such computer storage media may be part of computing device 505. Moreover, the computer readable media may include computer-executable instructions that, when executed by processor(s) 512, perform various functions and/or operations described herein. In contrast, communication media may embody computer readable instructions, data structures, program modules, or other data in a modulated data signal, such as a carrier wave, or other transmission mechanism. As defined herein, computer storage media does not include communication media.

In at least one example, computing device 505 may also have input device(s) 555 such as keyboard, mouse, pen, voice input device, touch input device, etc. Output device(s) 560 such as a display, speakers, printer, etc. may also be included. These devices are well known in the art and are not discussed at length here. In at least one example, computing device 505 may also contain communication connection(s) 565 that allow the device to communicate with other computing devices 570, such as over a network. These networks may include wired networks as well as wireless networks. In at least one example, communication connections 565 is one example of communication media. Here, computing device 505 is one example of a suitable device and is not intended to suggest any limitation as to the scope of use or functionality of the various embodiments described.

Other well-known computing devices 570, systems, environments and/or configurations that may be suitable for use with the embodiments include, but are not limited to, personal computers, server computers, hand-held or laptop devices, multiprocessor systems, microprocessor-based systems, set top boxes, game con soles, programmable consumer electronics, network PCs, minicomputers, mainframe computers, distributed computing environments that include any of the above systems or devices, and/or the like. For example, some or all of the components of computing device 505 may be implemented in a cloud computing environment, such that resources and/or services are made available via a computer network for selective use by the user devices.

By way of example, and not limitation, system memory 525 also illustrates program modules 545, which may include client applications, Web browsers, mid-tier applications, relational database management systems (RDBMS), etc., program data 540, and an operating system 550. By way of example, operating system 550 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome OS, and the like) and/or mobile operating systems such as iOS, Windows® Phone, Android OS, BlackBerry® OS, and Palm® OS operating systems. Generally, programs include routines, methods, data structures, other software components, etc., that perform particular tasks, functions, or implement particular abstract data types. All or portions of operating system 550, program modules 545, and/or program data 540 can also be cached in memory such as the volatile memory and/or non-volatile memory, for example. It is to be appreciated that the disclosed architecture can be implemented with various commercially available operating systems or combinations of operating systems (e.g., virtual machines).

In at least one example, system bus 520 provides an interface for system components including, but not limited to, system memory 525, to processing unit 510. In at least one example, system bus 520 can be of any of several types of bus structure that can further interconnect to memory bus (with or without controller), and a peripheral bus (e.g., PCI, PCIe, AGP, LPC, etc.), using any of a variety of commercially available bus architectures.

Figure 6:
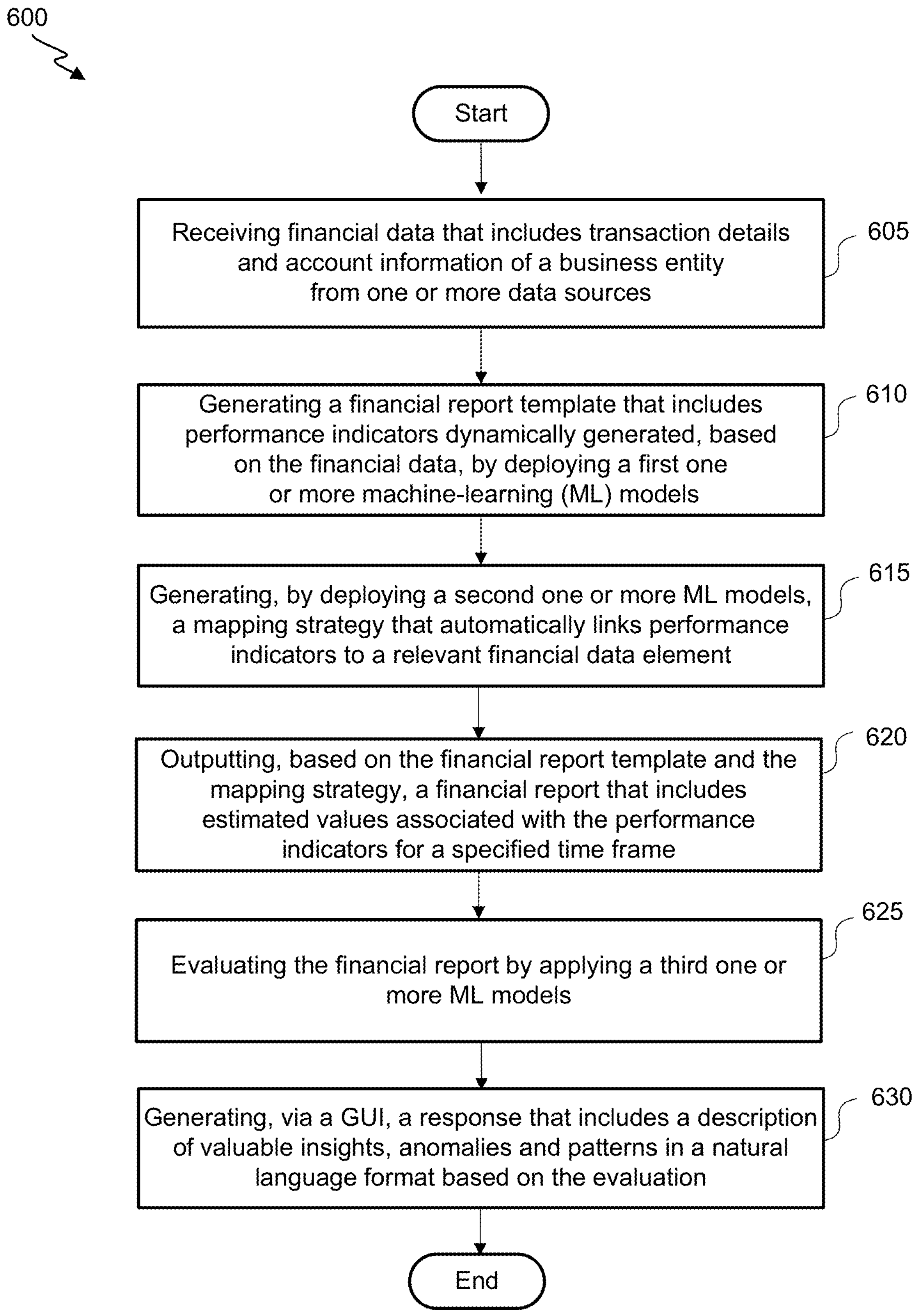
FIG. 6 illustrates a flowchart showing a computer-implemented method for generating AI-driven financial reports and responses, in accordance with at least one example.

FIG. 6 illustrates a flowchart showing a computer-implemented method for generating AI-driven financial reports 120*a* and responses 120*b* in real-time, in accordance with at least one example. The blocks in flowchart are illustrated in a specific order, while the order can be modified, for example, some blocks may be performed before other, and some blocks may be performed simultaneously. The block can be performed by hardware, software, or a combination thereof. The process at block 605 may include receiving financial data of a business entity from one or more data sources, where the financial data may include transaction details, account information (e.g., account name, date, income or balance sheet and account category). At block 610, financial report template 235 may be generated that may define a structure of financial report 120*a* (e.g., profit and loss (P&L) statement). The financial report template 235 may include a set of performance indicators that are dynamically generated, based on the financial data, by deploying a first one or more machine-learning (ML) models. The ML models may be trained in financial accounting practices to analyze the financial data for generating the set of performance indicators or P&L indicators. These performance indicators may define a set of rules based on the financial data that an organization may require to estimate. The set of performance indicators may be different for different organizations. The focus of the P&L indicators may be to find a financial metric that may lead to net income.

At block 615, a mapping strategy may be generated in real-time that automatically links a performance indicator to a relevant financial data element by deploying a second one or more ML models. Based on financial report template 235 and financial report mapping template 240 (e.g., a mapping strategy), financial report 120*a* may be generated that includes a set of estimated values associated with the set of performance indicators for a specified time frame, at block 620. For block 625, generated financial report 120*a* may be evaluated by applying a third one or more ML models. In response to the evaluation, at block 630, an analysis report may be generated that includes a description of valuable insights, anomalies, and patterns in a natural language format.

Figure 7:
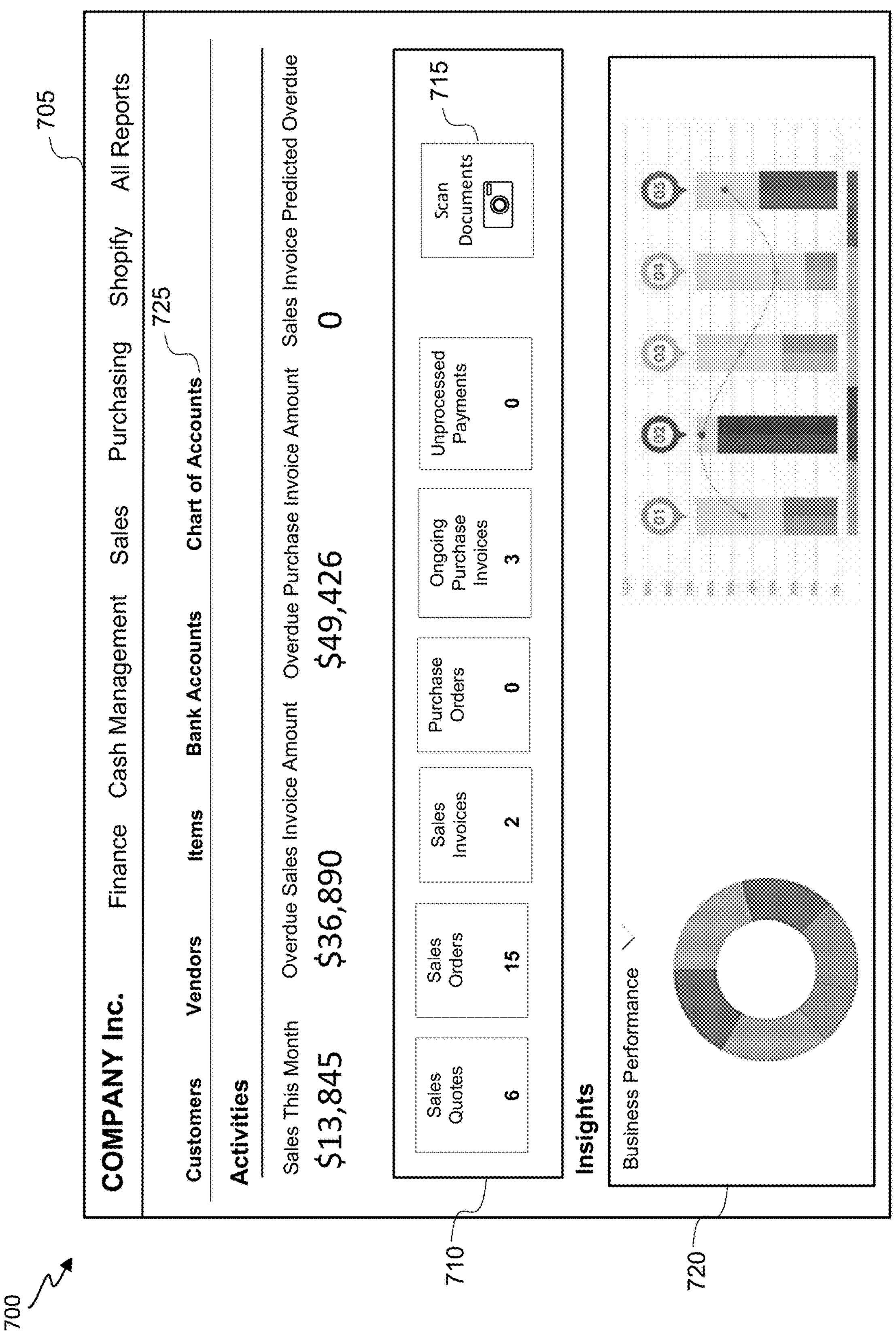
FIG. 7 is a screenshot of a dashboard user interface, in accordance with at least one example.

FIG. 7 is a screenshot of a dashboard user interface 700, in accordance with at least one example. The system may be used by one or more clients or users 105 that represent a business entity (e.g., executives, directors, or other authorities) that may access financial data from the databases of the organization. In at least one example, the system offers AI generated financial reports 120*a* comprehending P&L insights in various aspects and generates responses 120*b* for related queries 125 in natural language as compared to other tools that targets financial analysis (e.g., Excel and other related tools). Referring to FIG. 7, one or more clients or users 105 may be provided with a dashboard 705 for using the examples of the system. In at least one example, dashboard user interface 700 may access financial data for various internal (that are manually entered and stored) and external sources (e.g., excel sheets, scanned documents 715). In at least one example, dashboard 705 may include various other features such as statistical summaries of sales and purchase 710, business insights with various forms of visualizations 720. For manually entering financial data related to accounts, "chart of accounts" 725 feature may be selected from dashboard 705.

The term "chart of accounts" (COA) 725 may generally refer to an index of all the financial accounts in the general ledger (G/L) of a business entity. It represents an organizational tool that lists by category and lines up all items in the financial transactions that the business entity conducted during a specific accounting period. For creating COA 725, the financial data can be collected from various sources and then processed using AI. The financial data may include transaction records, balance sheets, income statements and other relevant financial documents. For integration with external systems e.g., financial softwares or cloud services that store the relevant data, application programming interfaces (APIs) can be utilized. APIs allow seamless integration and data retrieval within various data sources.

In at least one example, the financial data can be manually entered into the system and/or collected from spreadsheets such as Excel sheets, CSV files or other unstructured document types. In at least one example, the system offers tools (e.g., data migration) to import data according to a defined template. The system may perform validation checks on the collected data for enabling accuracy and integrity. The data validations may involve checking for inconsistencies, errors, missing data, data duplication or formatting errors. The financial data may further undergo preprocessing to transform and format the imported data as needed. This could involve standardizing formats, transforming currencies, or applying other adjustments to align the data according to the processing requirements of the system. The collected financial data may be organized into a predefined categorized structure to organize data into meaningful structure.

The income statement and balance sheet may be considered significant for the financial reporting of an organization. In a BI, an account in the income statement or a balance sheet may be called a G/L account, where all the accounts make up a chart of accounts (COA) 725 list. COA 725 may include a structured listing of all the G/L accounts used by an organization and/or business entity to record financial transactions. COA 725 may be the core of the finance. In at least one example, COA 725 is used to group income and expenses in the income statement and balance sheet and defines indentation levels for a structured overview of the financials. COA 725 may reflect how the business is organized. Each individual G/L account in COA 725 corresponds to a unique category, such as assets, liability, equity, revenue, income, cost of goods, expenses, and the like. In the list of COA 725, G/L accounts can be viewed at once, where a G/L account card for each account can be accessed or modified from the COA 725 list.

Figure 8:
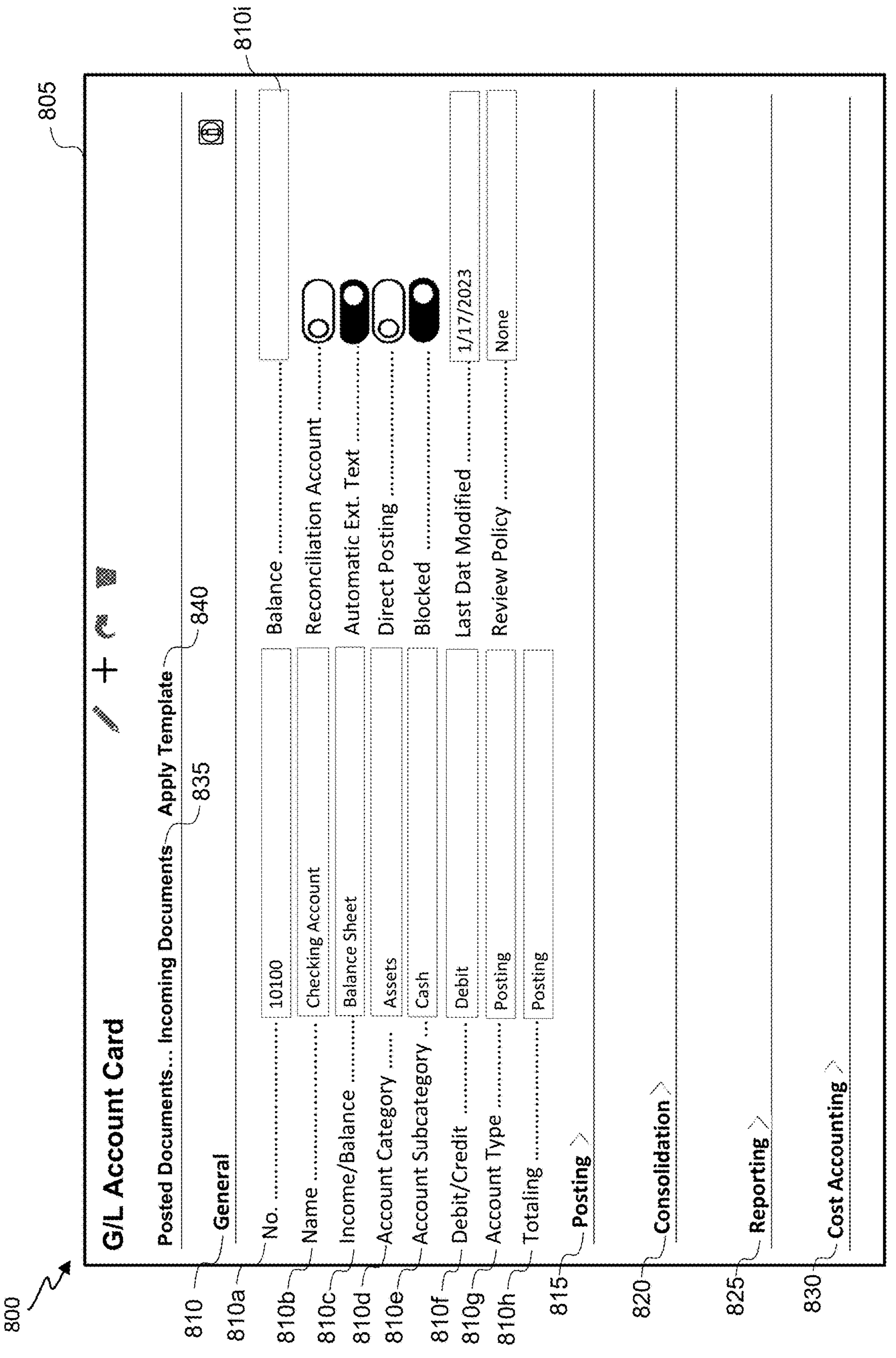
FIG. 8 is a screenshot of a user interface for receiving a set of inputs for a general ledger (G/L) account, in accordance with at least one example.

FIG. 8 is a screenshot of a general ledger (G/L) account user interface 800 for entering a set of inputs, in accordance with at least one example. To create and/or edit a G/L account, G/L account card 805 may include a set of inputs from various sections e.g., general 810, posting 815, consolidation 820, reporting 825, and/or cost accounting 830. In at least one example, general section 810 may further include inputs such as, account number 810*a*, account name (or account description) 810*b*, whether account is an income statement or balance sheet for closing at the fiscal year-end (income/balance) 810*c*, a predefined G/L account category 810*d* e.g., assets, equity, liabilities, income, cost of goods sold, expense, subcategory 810*e* of the account category of the G/L account, debit/credit 810*f*, and/or other related inputs.

In at least one example, input field account type 810*g* indicates the purpose for the account in different lists, journals, and reports. The available options can be, posting—account type where entries can be posted, heading—used for description and reporting purposes, total—used to total the accounts that are nominated in totaling field 810*h*, begin-total—marks the beginning of an account range in totaling field 810*h*, end-total—marks the end of an account range in totaling field 810*h*. Reporting 825 can be used to specify for processing exchange rate adjustments between the local currency and the additional reporting currency for this account. On consolidation 820, debit and credit account information can be entered for the consolidation company to map with. Cost accounting 830 can show the cost type the G/L account is mapped to. For instantly creating a G/L account, apply template 840 representing an input configurations template can be selected. The tab posted documents without incoming documents 835 shows a list of posted purchase and sales documents under the G/L account that do not have related incoming document record.

FIG. 9 is a screenshot, displaying a list of G/L accounts as "chart of accounts" 725 in a user interface 900, in accordance with at least one example. As can be seen from the FIG. 9, the collected financial data may be organized into categories 810*d* e.g., assets 905*b* and liabilities 905*c* and further subcategories 810*e*. For example, in a subcategory of assets 905*b*, a G/L account 910 shows, number 810*a* as "10100," name 810*b* as "Checking Account," net change 905*a* as "1638.40," balance 810*i* as "1638.40," income/balance 810*c* as "Balance," account subcategory 810*e* as "Cash" and account type 810*g* is "Posting." The column net change 905*a* specifies the net change in the account balance 810*i* during a specified time period.

For AI generated financial reports 120*a*, the collected data can be stored in databases or records, also referred to as registers. The journal may be a general term while register is a specialized term that stores specific types of information. These registers may help structure and manage data related to different business activities. For example, a general ledger (G/L) register is a record that includes a comprehensive summary of all financial transactions within an organization or a business entity. It may provide an overview of entries made in the general ledger, showing details e.g., account codes, amounts, and transaction dates. In AI financial reporting, advanced analytics and AI may be applied to the G/L register to gain insights, detect patterns, and assist in decision-making. Examples of other registers may include vendor register, customer register, item register, employee register, bank register, and/or fixed asset register.

Besides structuring chart of accounts (COA) 725, account categories 810*d* and subcategories 810*e* can be used to create financial reports 120*a* (such as balance sheet, income statement, cash flow statement, and retained earnings reports) and to generate account schedules for the respective reports. By selecting a G/L account from COA 725, a further detailed window is popped up, like the interface of G/L account card 805 for further modifying or editing account. After setting up COA 725, financial reports 120*a* can be generated from COA 725 user interface 900 for the authorized role (e.g., business manager or accountant). In at least one example, AI-driven financial reports 120*a* can be customized according to the specific needs of users by designing report templates 235. A goal of creating report template 235 is to provide a standardized layout including targeted P&L indicators that can be easily estimated with relevant financial data.

Figure 10:
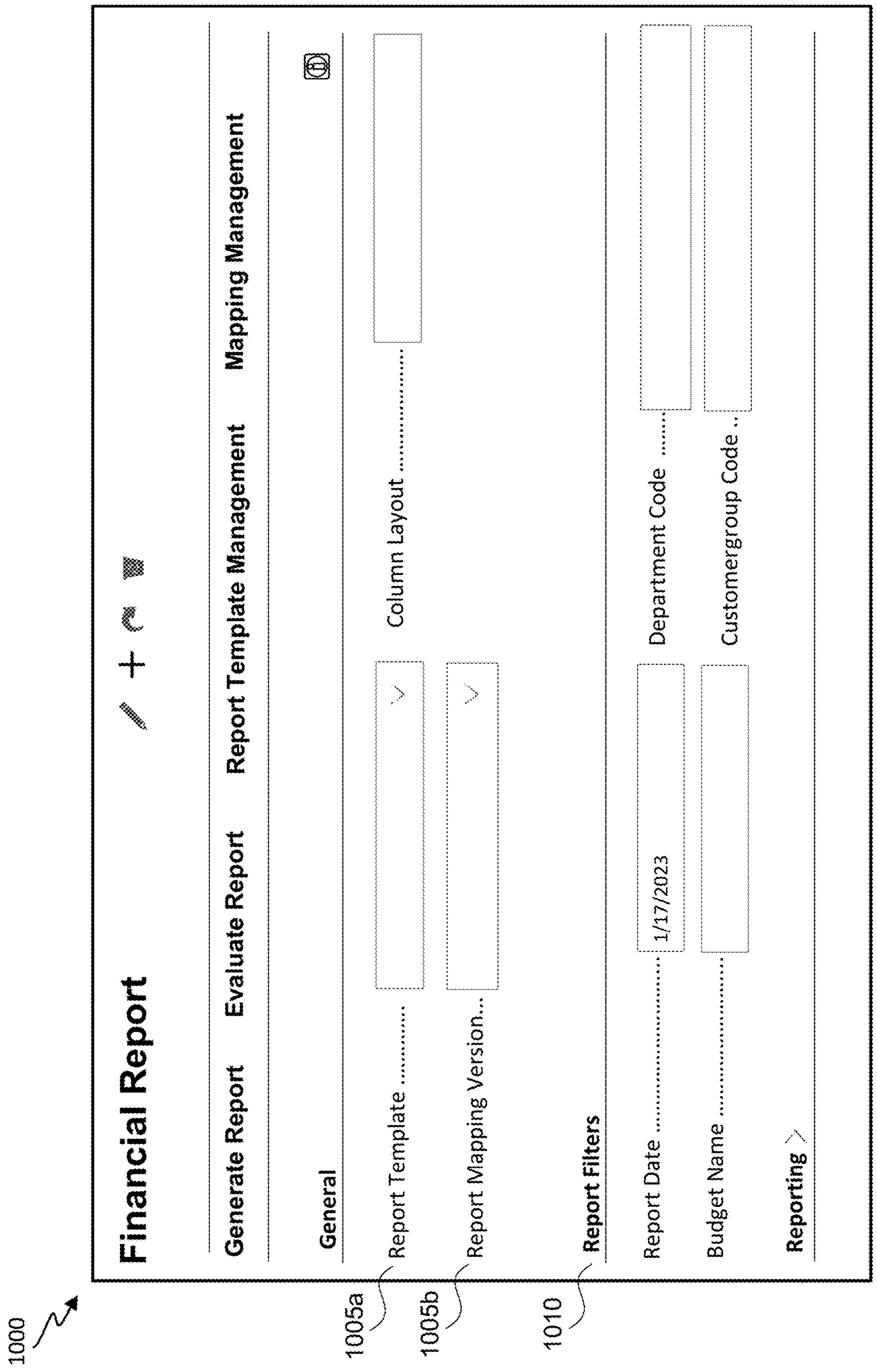
FIG. 10 is a screenshot of a "Financial Report" user interface, in accordance with at least one example.

FIG. 10 is a screenshot of a "Financial Report" user interface 1000, in accordance with at least one example. In at least one example, interface 1000 may provide multiple data fields to input parameters for AI-driven financial report 120*a* generation. For example, interface 1000 may include input data fields: report template 1005*a*, report mapping version 1005*b*, and various report filters 1010. In at least one example, report template 1005*a* input serves as an AI-generated format or structure for generating financial reports. It may include various performance indicators that are referred to as report lines in the example embodiment of the system such as revenue, expenses, loss, and other performance indicators. The financial report template may be generated using "Financial Report" interface 1000.

FIG. 11 is a screenshot of a user interface 1100 of an AI-generated "Financial Report Template Design," in accordance with at least one example. In at least one example, user-interface 1100 may include financial report template 235 comprising report line ids 1110, description 1115, and parent column 1120. The report lines are the performance indicators that are grouped together as indicated in the line id with e.g., '1' as leading category having indentation of "1.1" or "1.2" as the subcategories of report lines. The report lines may be derived from parent column 1120 report line indicated in parent column 1120. For example, a group of report lines 1130 such as cost of labor, cost of labor projects, cost of labor warranty/contract are derived from a parent, cost of resources and services 1127, which is derived from cost of good (COGS) 1125 and so on. In at least one example, AI-generated report template 235 may be customized by adding or removing report lines from user interface 1100. In at least one example, description 1115 of a given report line may also be modified by selecting it. Generated report template 235 may be saved into database 245, updated using AI or previously saved template may be opened by configuring options from a menu 1135 in interface 1100.

FIG. 12 is a screenshot of an AI-generated "Financial Intelligence Mapping Management" user-interface 1200, in accordance with at least one example. In at least one example, once report template 235 is designed, financial report mapping template 240 is generated using AI engine 250. In at least one example, AI engine 250 may generate a mapping between the identified P&L indicators from report template 235 and the corresponding financial accounts or chart of accounts (COA) 725. This mapping may enable each P&L indicator to be associated with appropriate financial data element (or an account) for calculation. In at least one example, financial report mapping template 240 may include account codes 1210, account names 1215 and mapped report lines 1220 from the generated report template 235.

The system may include quality checks and validations to enable accuracy and consistency of generated mapping template 1205. In quality checking, report mapping template 240 may be validated to confirm each report line is mapped to relevant G/L account from account codes 1210. In case the mapping is found incorrect, a different account or a report line may be selected in the designated input data fields through user-interface 1100. The validated financial report mapping template 240 may be saved into database 245, cleared or previously saved mapping template may be opened by configuring options from a menu 1225 in user-interface 1200.

Figure 13:
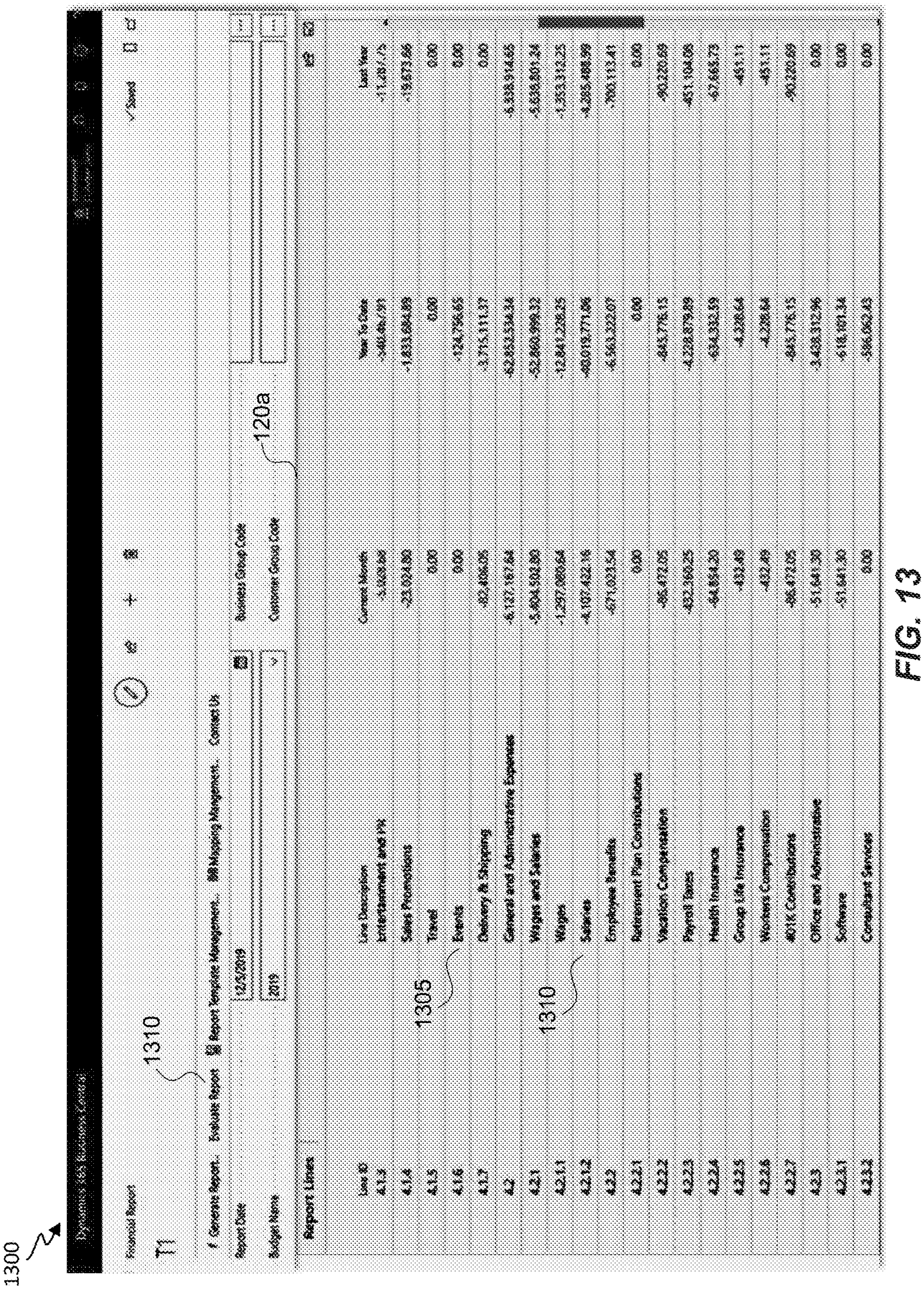
FIG. 13 is a screenshot displaying an estimated profit and loss (P&L) statement through a user interface, in accordance with at least one example.

FIG. 13 is a screenshot displaying an estimated P&L statement through a user interface 1300, in accordance with at least one example. Referring to FIG. 13, the system includes AI engine 250 that may take AI-generated financial report template 235 and AI-generated financial report mapping template 240 from database 245 and generate financial report 120*a* instantly within seconds by utilizing AI, derived from existing COA 725. Financial reports 120*a*, also termed as an income statement, may estimate the P&L indicators (report lines) from generated report template 235 during a specific time period. In at least one example, financial reports 120*a* (e.g., a profit and loss (P&L) report) outline the financial performance of the organization over a specific period. In at least one example, financial reports 120*a* can be structured to reflect both the performance of the current month up to the report date and the cumulative performance for the current year up to the report date. Each line item in the report is compared against the budgeted figures for the same period, allowing for an analysis of variances and budget coverage. In at least one example, financial reports 120*a* may further include report lines that are specific items or categories that contribute to the overall financial performance of a business entity. For example, events 1305 and report tab 1310 (e.g., salaries) are examples of report lines as illustrated in the screenshot of FIG. 13. Financial reports 120*a* may help in organizing and analyzing financial information for better insights into the performance of an organization.

FIG. 14 is a screenshot displaying a user interface 1400 for displaying an AI-generated evaluation of financial reports 120*a* (e.g., a profit and loss (P&L) statement), in accordance with at least one example. In at least one example, AI engine 250 analyzes financial reports 120*a* to understand the content and statistics within. The system may evaluate the report by configuring report tab 1310 from user interface 1300. Subsequently, an analysis report is generated that includes a description of insights and summary in a natural language format. The AI-generated analysis report may highlight anomalies (e.g., spikes in expenses, drops in sales, or unusual pattern from expected patterns in financial data such as shown in the illustrative screenshot of FIG. 14).

In at least one example, the disclosed system provides a dynamic and interactive dimension to decision-making, providing intelligent and data-driven answers by leveraging AI. The system can offer a financial reporting solution that goes beyond static reporting by incorporating interactive dimensions. One or more clients or users 105 can be engaged with the system by asking questions or user queries 125 and receive dynamic answers 130 regarding report analytics.

Figure 15:
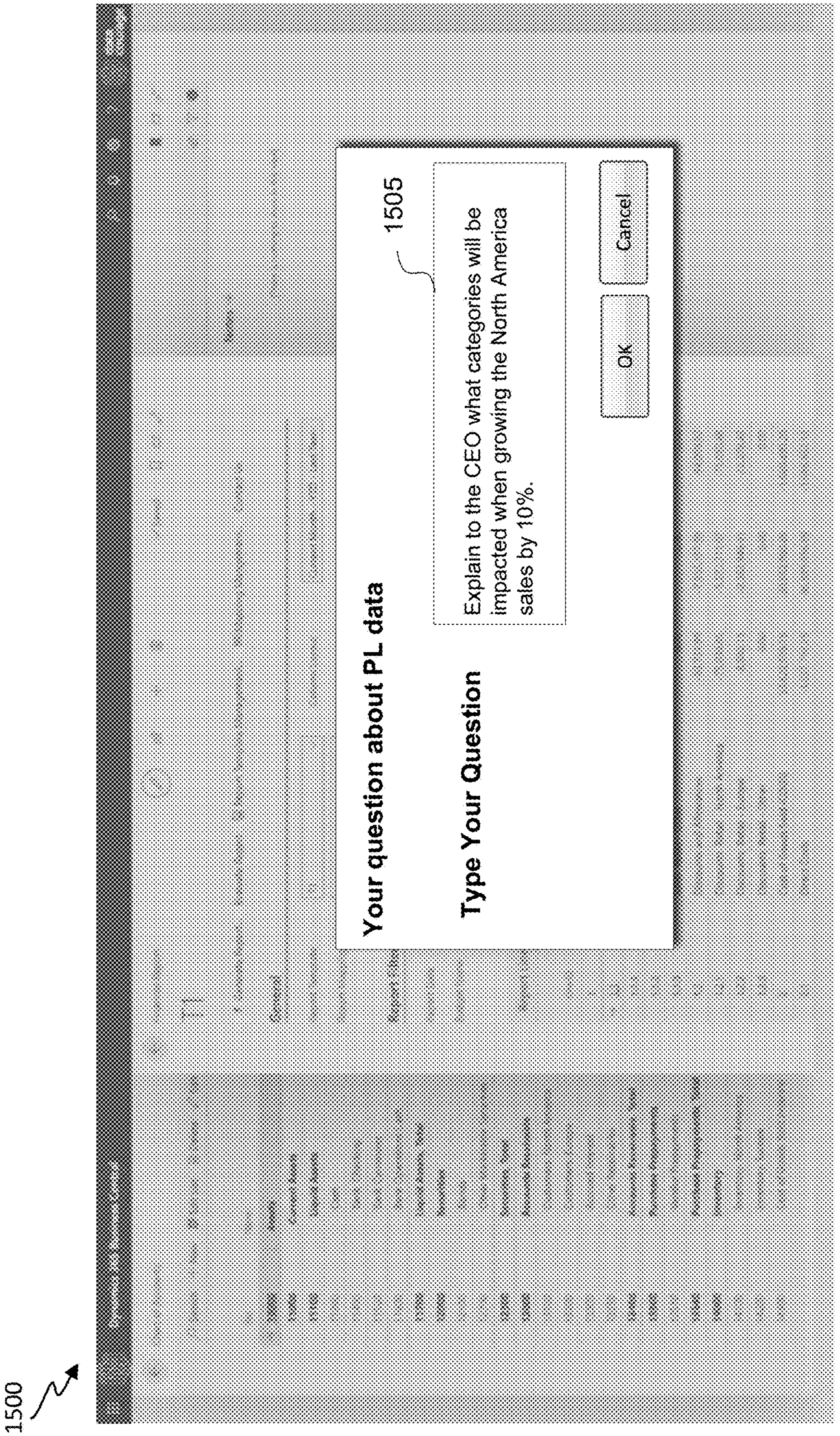
FIG. 15 is a screenshot displaying a user interface for asking a P&L related question, in accordance with at least one example.

FIG. 15 is a screenshot displaying a user interface 1500 for asking a profit and loss (P&L) related question 1505 in a natural language format, in accordance with at least one example. In at least one example, the system evaluates P&L statements and provides an interactive graphical user interface (GUI) with the ability to ask questions and get answers through AI. This may enable immediate access to financial insights, interaction with the provided financial data within a given interface, and detailed responses of the questions instantly. A client may ask any question 1505 related to P&L by typing a question 1505 in a natural language format (in any language) through configuring the user interface. This transformative feature may enable that businesses not only to analyze the financial reports with accuracy but also engage in dynamic, interactive decision-making. With AI-driven insights and real-time Q&A, the examples of the system direct the businesses towards proactive and informed financial strategies.

FIG. 16 is a screenshot displaying a user-interface 1600 of an AI-generated response of the P&L related question 1505, in accordance with at least one example. User-interface 1600 exemplifies the seamless integration of AI in delivering insightful responses within the financial domain. The content of the report reflects an easy and sophisticated understanding of P&L query 1505, providing accurate and relevant information. The response shows various performance indicators (e.g., highlighting a critical 1615 or a negatively impacted performance indicator 1620) regarding the asked query 1505. For example, for "Evaluating the impact of North Sales by 10%," the performance indicator "Total Revenue" 1605, is described as, "The Total Revenue for the current month is reported at $1,879,325 against a budget of $1,968,086, showing a shortfall of $88.761.28." The generated response further explains a growth, impact, and margin as, "However, the 'Current Year up to report Date' shows a significant overperformance with actuals at $169.691.733 against a budget of $19,747,956, indicating a robust year with a difference of $149.943,777.03." Additionally, the response shows a structured indentation of performance indicators into multi-levels e.g., "Total Revenue" 1605 is at level 1, "Sales Revenue" 1610 is at level 2, and "Sales-Retail-North America" 1610 is at level 3.

Figure 17:
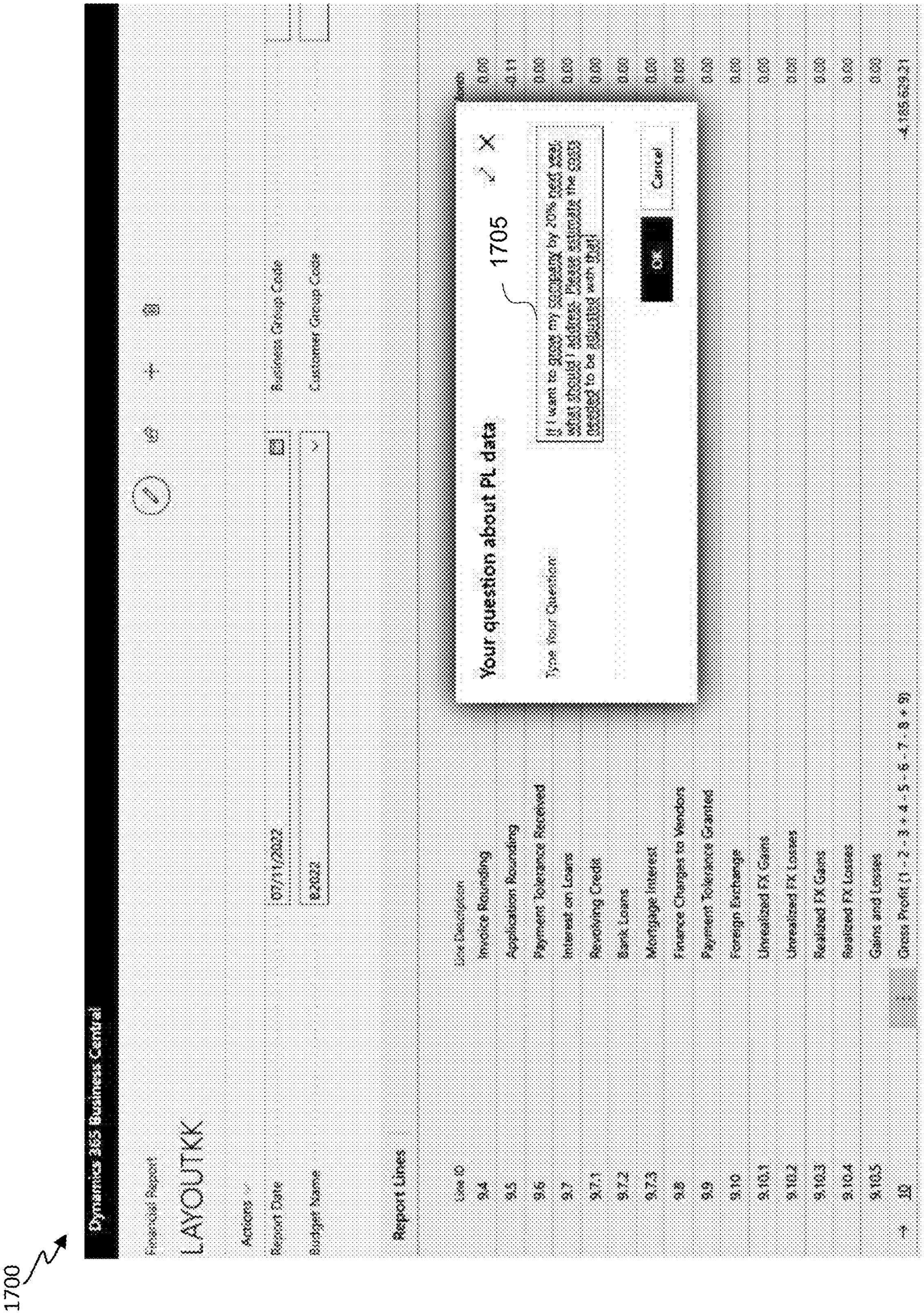
FIG. 17 is a screenshot displaying a user interface for asking another P&L related question, in accordance with at least one example.

FIG. 17 is a screenshot displaying a user interface 1700 for asking another P&L related question 1705 in the natural language format, in accordance with at least one example. The interface 1700 exemplifies a simple and user-friendly interaction for querying. The query 1705 comprises an intersection of AI and financial planning. The user queries for an actionable insight that aligns with the objectives of the user and consequent in growth of the company.

Figure 18:
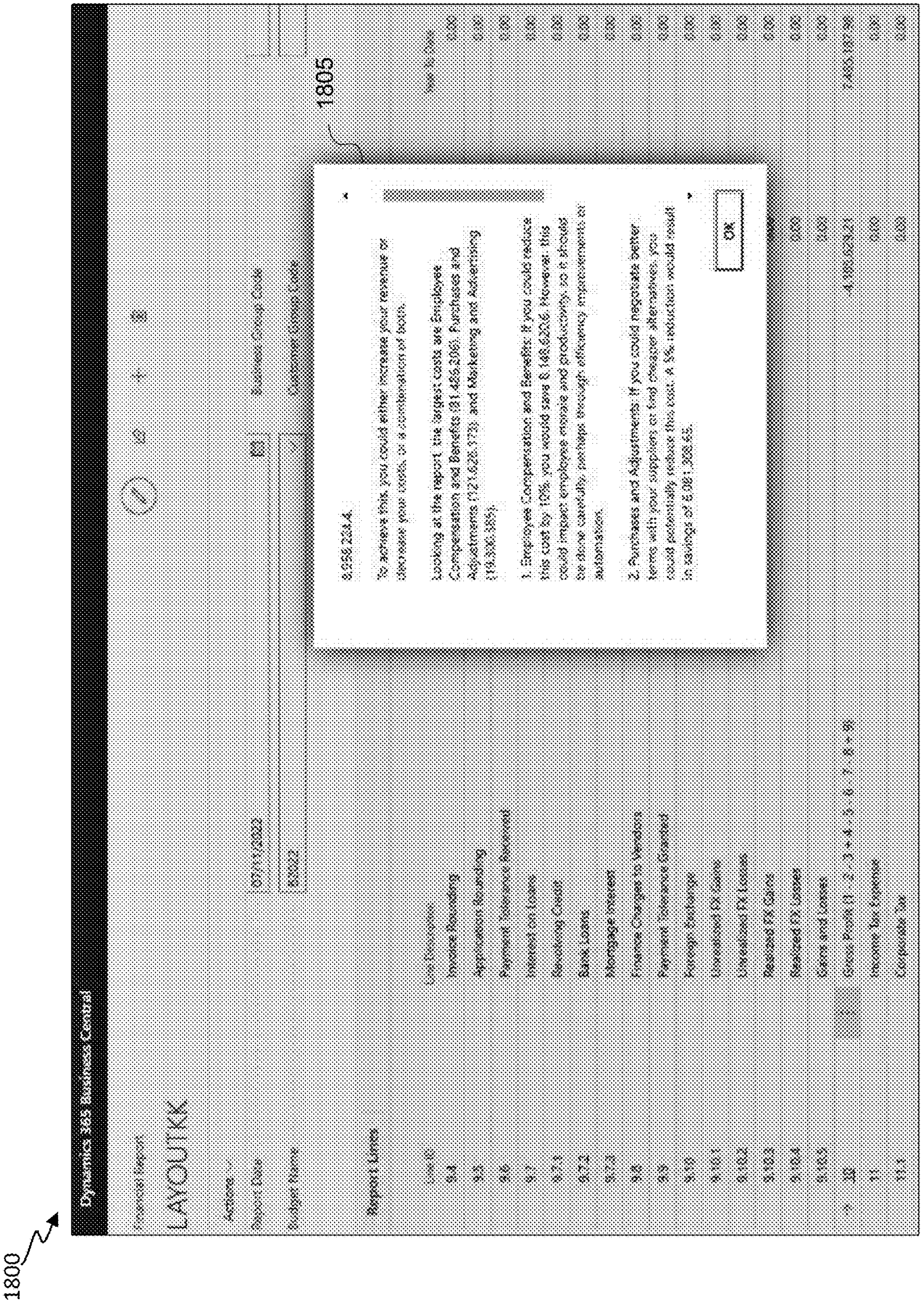
FIG. 18 is a screenshot displaying a user interface of the other AI-generated response of the P&L related question, in accordance with at least one example.

FIG. 18 is a screenshot displaying a user interface 1800 of the other AI-generated response of P&L related question 1705, in accordance with at least one example. AI generated response 1805 may provide strategic guidance for achieving the goals of the user of growing company next year by 20% as stated in P&L related question 1705. AI generated response 1805 may suggest various primary avenues for achieving growth. For example, by reducing the costs of employee compensation and benefits by 10%. The other suggestion in AI generated response 1805 is a 5% reduction in purchases by negotiating with suppliers for the adjustments or cheaper alternatives.

In at least one example, one or more machine-readable storage media (e.g., memory) are provided which stores one or more machine-executable instructions. In at least one example, when one or more machine-executable instructions are executed by a machine (e.g., one or more processors), one or more methods described herein are performed. In at least one example, machine-readable storage media is a tangible non-transitory machine-readable media. In at least one example, machine-readable storage media comprises one of volatile or non-volatile memory, or a combination of them.

The following are additional examples provided in view of the above-described implementations. Here, one or more features of example, in isolation or in combination, can be combined with one or more features of one or more other examples to form further examples also falling within the scope of the disclosure. As such, one implementation can be combined with one or more other implementation without changing the scope of disclosure.

Example 1 is a computer-implemented method comprising receiving financial data of a business entity from one or more data sources, wherein the financial data includes transaction details and account information; generating a financial report template that defines a structure of a financial report, wherein the financial report template includes a set of performance indicators that are dynamically generated, based at least in part on the financial data, by deploying a first one or more machine-learning models; generating, by deploying a second one or more machine-learning models, a mapping strategy that automatically links a performance indicator of the set of performance indicators to a relevant financial data element of the financial data; outputting, based on the financial report template and the mapping strategy, a financial report that includes a set of estimated values associated with the set of performance indicators for a specified time frame; evaluating the financial report by applying a third one or more machine learning models; and generating, via a graphical user interface (GUI), a response that includes a description of valuable insights, anomalies and patterns in a natural language format based on the evaluation.

Example 2 is a computer-implemented method according to any example herein, particularly example 1, wherein the response further includes: providing, via the GUI, an interactive session to ask a question in the natural language format related to the financial report; and generating in real-time, based on the question, an answer in the natural language format by deploying one or more large language models (LLMs) that are configured to generate analytics and predictions based on the evaluation of the financial report.

Example 3 is a computer-implemented method according to any example herein, particularly example 1, further includes categorizing the financial data by applying a fourth one or more machine-learning models that group the financial data into categories and subcategories based on account information.

Example 4 is a computer-implemented method according to any example herein, particularly example 1, wherein the financial report template is customized by adding one or more new performance indicators, wherein adding a new performance indicator of the one or more new performance indicators includes inputting, via the GUI, a brief description in the natural language format from a user; and deploying a natural language processing to extract a meaningful performance indicator from the brief description; or deleting, via the GUI, one or more performance indicators of the set of performance indicators.

Example 5 is a computer-implemented method according to any example herein, particularly example 4, further includes storing the customized financial report template into a database.

Example 6 is a computer-implemented method according to any example herein, particularly example 1, further includes determining that the performance indicator of the set of performance indicators in the mapping strategy is not correctly mapped to the relevant financial data element of the financial data; mapping, based on the determination, a different financial element from the financial data to the performance indicator of the set of performance indicators in the mapping strategy; and storing the mapping strategy into a database.

Example 7 is a computer-implemented method according to any example herein, particularly example 1, wherein the natural language format includes one or more of: English, German, Polish, French, Espanol, or Chinese.

Example 8 is a computer-implemented method according to any example herein, particularly example 1, further includes receiving one or more financial documents comprising the financial data of the business entity, wherein a financial document of the one or more financial documents includes an invoice, a receipt, a bank statement or a purchase order; and extracting the financial data by applying natural language processing to interpret unstructured data within the financial document of the one or more financial documents.

Example 9 is a system comprising one or more data processors; and a non-transitory computer readable storage medium containing instructions which, when executed on the one or more data processors, cause the one or more data processors to perform actions including: receive financial data of a business entity from one or more data sources, wherein the financial data includes transaction details and account information; generate a financial report template that defines a structure of a financial report, wherein the financial report template includes a set of performance indicators that are dynamically generated, based at least in part on the financial data, by deploying a first one or more machine-learning models; generate, by deploying a second one or more machine-learning models, a mapping strategy that automatically links a performance indicator of the set of performance indicators to a relevant financial data element of the financial data; output, based on the financial report template and the mapping strategy, a financial report that includes a set of estimated values associated with the set of performance indicators for a specified time frame; evaluate the financial report by applying a third one or more machine learning models; and generate, via a graphical user interface (GUI), a response that includes a description of valuable insights, anomalies and patterns in a natural language format based on the evaluation.

Example 10 is a system of any example herein, particularly example 9, wherein the response further includes providing, via the GUI, an interactive session to ask a question in the natural language format related to the financial report; and generating in real-time, based on the question, an answer in the natural language format by deploying one or more large language models (LLMs) that are configured to generate analytics and predictions based on the evaluation of the financial report.

Example 11 is a system of any example herein, particularly example 9, wherein the response further includes categorizing the financial data by applying a fourth one or more machine-learning models that group the financial data into categories and subcategories based on account information.

Example 12 is a system of any example herein, particularly example 9, wherein the financial report template is customized by adding one or more new performance indicators, wherein adding a new performance indicator of the one or more new performance indicators includes inputting, via the GUI, a brief description in the natural language format from a user; and deploying a natural language processing to extract a meaningful performance indicator from the brief description; or deleting, via the GUI, one or more performance indicators of the set of performance indicators.

Example 13 is a system of any example herein, particularly example 12, further includes storing the customized financial report template into a database.

Example 14 is a system of any example herein, particularly example 9, further includes: determining that the performance indicator of the set of performance indicators in the mapping strategy is not correctly mapped to the relevant financial data element of the financial data; mapping, based on the determination, a different financial element from the financial data to the performance indicator of the set of performance indicators in the mapping strategy; and storing the mapping strategy into a database.

Example 15 is a system of any example herein, particularly example 9, wherein the natural language format includes one or more of: English, German, Polish, French, Espanol, or Chinese.

Example 16 is a system of any example herein, particularly example 9, further includes receiving one or more financial documents comprising the financial data of the business entity, wherein a financial document of the one or more financial documents includes an invoice, a receipt, a bank statement, or a purchase order; and extracting the financial data by applying natural language processing to interpret unstructured data within the financial document of the one or more financial documents.

Example 17 is a computer-program product tangibly embodied in a non-transitory machine-readable storage medium, including instructions configured to cause one or more data processors to perform action including receiving financial data of a business entity from one or more data sources, wherein the financial data includes transaction details and account information; generating a financial report template that defines a structure of a financial report, wherein the financial report template includes a set of performance indicators that are dynamically generated, based at least in part on the financial data, by deploying a first one or more machine-learning models; generating, by deploying a second one or more machine-learning models, a mapping strategy that automatically links a performance indicator of the set of performance indicators to a relevant financial data element of the financial data; outputting, based on the financial report template and the mapping strategy, a financial report that includes a set of estimated values associated with the set of performance indicators for a specified time frame; evaluating the financial report by applying a third one or more machine learning models; and generating, via a graphical user interface (GUI), a response that includes a description of valuable insights, anomalies and patterns in a natural language format based on the evaluation.

Example 18 is a computer-program product of any example herein, particularly example 17, wherein the response further includes providing, via the GUI, an interactive session to ask a question in the natural language format related to the financial report; and generating in real-time, based on the question, an answer in the natural language format by deploying one or more large language models (LLMs) that are configured to generate analytics and predictions based on the evaluation of the financial report.

Example 19 is a computer-program product of any example herein, particularly example 17, wherein the natural language format includes one or more of: English, German, Polish, French, Espanol, or Chinese.

Example 20 is a computer-program product of any example herein, particularly example 17, further includes categorizing the financial data by applying a fourth one or more machine-learning models that group the financial data into categories and subcategories based on account information.

Example 21 is a computer-program product of any example herein, particularly example 17, wherein the financial report template is customized by adding one or more new performance indicators, wherein adding a new performance indicator of the one or more new performance indicators includes inputting, via the GUI, a brief description in the natural language format from a user; and deploying a natural language processing to extract a meaningful performance indicator from the brief description; or deleting, via the GUI, one or more performance indicators of the set of performance indicators.

Example 22 is a computer-program product of any example herein, particularly example 21, further includes storing the customized financial report template into a database.

Example 23 is a computer-program product of any example herein, particularly example 17, further includes determining that the performance indicator of the set of performance indicators in the mapping strategy is not correctly mapped to the relevant financial data element of the financial data; mapping, based on the determination, a different financial element from the financial data to the performance indicator of the set of performance indicators in the mapping strategy; and storing the mapping strategy into a database.

Example 24 is a computer-program product of any example herein, particularly example 17, further includes receiving one or more financial documents comprising the financial data of the business entity, wherein a financial document of the one or more financial documents includes an invoice, a receipt, a bank statement, or a purchase order; and extracting the financial data by applying natural language processing to interpret unstructured data within the financial document of the one or more financial documents.

At least one example of the present disclosure includes a system including one or more data processors. In at least one example, the system includes a non-transitory computer readable storage medium containing instruction which, when executed on the one or more data processors, cause the one or more data processors to perform part or all of one or more methods and/or part or all of one or more processes disclosed herein. At least one example of the present disclosure includes a computer-program product tangibly embodied in a non-transitory machine-readable storage medium, including instructions configured to cause one or more data processors to perform part or all of one or more methods and/or part or all of one or more processes disclosed herein.

The present description provides preferred exemplary embodiments only, and is not intended to limit the scope, applicability, or configuration of the disclosure. Rather, the present description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the present description to provide a thorough understanding of the examples. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the examples.

I claim:

1. A computer-implemented method comprising:

receiving financial data of a business entity from one or more data sources, wherein the financial data includes transaction details and account information, wherein the financial data is extracted from one or more financial documents comprising an invoice, a receipt, a bank statement, or a purchase order by applying optical character recognition (OCR) technology to transform images from scanned financial documents into machine-readable text, and by applying data extraction algorithms that identify and extract amounts, dates, and transaction details from the machine-readable text;

categorizing the financial data by applying a fourth one or more machine-learning models that group the financial data into hierarchical categories and subcategories based on the account information, wherein the fourth one or more machine-learning models include supervised techniques comprising neural networks, long short-term memory, support vector machines, or decision trees trained on labeled data to predict the category and subcategory for the extracted financial data;

generating a financial report template that defines a structure of a profit and loss statement, wherein the financial report template includes a set of profit and loss indicators that are dynamically generated, based at least in part on the financial data, by deploying a first one or more machine-learning models trained in financial accounting practices to analyze the financial data for generating the set of profit and loss indicators that lead to net income;

generating, by deploying a second one or more machine-learning models, a mapping strategy that automatically links a profit and loss indicator of the set of profit and loss indicators to a relevant financial data element of the financial data from a chart of accounts;

outputting, based on the financial report template and the mapping strategy, a profit and loss statement that includes a set of estimated values associated with the set of profit and loss indicators for a specified time frame;

evaluating the profit and loss statement by applying a third one or more machine-learning models to detect anomalies; and generating, via a graphical user interface (GUI), a response in real-time that includes a description of valuable insights, anomalies and patterns in a natural language format based on evaluating the profit and loss statement.

2. The computer-implemented method of claim 1, wherein the response further includes:

providing, via the GUI, an interactive session to ask a question in the natural language format related to the financial report; and generating in real-time, based on the question, an answer in the natural language format by deploying one or more large language models (LLMs) that are configured to generate analytics and predictions based on evaluating the financial report.

3. The computer-implemented method of claim 1, further includes:

categorizing the financial data by applying a fourth one or more machine-learning models that group the financial data into categories and subcategories based on the account information.

4. The computer-implemented method of claim 1, wherein the financial report template is customized by one of:

adding one or more new performance indicators, wherein adding a new performance indicator of the one or more new performance indicators includes:

inputting, via the GUI, a brief description in the natural language format from a user; and deploying a natural language processing to extract a meaningful performance indicator from the brief description; or deleting, via the GUI, one or more performance indicators of the set of profit and loss indicators.

5. The computer-implemented method of claim 4, further includes:

storing the customized financial report template into a database.

6. The computer-implemented method of claim 1, further includes:

performing quality checks and validations on the mapping strategy to ensure accuracy and consistency;

validating the mapping strategy to confirm that the profit and loss indicator of the set of profit and loss indicators is correctly mapped to the relevant financial data element of the financial data;

determining that the profit and loss indicator of the set of profit and loss indicators in the mapping strategy is not correctly mapped to the relevant financial data element of the financial data;

mapping, based on the determination, a different financial element from the financial data to the profit and loss indicator of the set of profit and loss indicators in the mapping strategy; and storing the mapping strategy into a database.

7. The computer-implemented method of claim 1, wherein the natural language format includes one or more of: English, German, Polish, French, Espanol or Chinese.

8. The computer-implemented method of claim 1, further includes:

receiving one or more financial documents comprising the financial data of the business entity, wherein a financial document of the one or more financial documents includes an invoice, a receipt, a bank statement, or a purchase order; and extracting the financial data by applying natural language processing to interpret unstructured data within the financial document of the one or more financial documents.

9. A system comprising:

one or more data processors; and a non-transitory computer readable storage medium containing instructions which, when executed on the one or more data processors, cause the one or more data processors to perform actions including:

receive financial data of a business entity from one or more data sources, wherein the financial data includes transaction details and account information, wherein the financial data is extracted from one or more financial documents comprising an invoice, a receipt, a bank statement, or a purchase order by applying optical character recognition (OCR) technology to transform images from scanned financial documents into machine-readable text, and by applying data extraction algorithms that identify and extract amounts, dates, and transaction details from the machine-readable text;

categorize the financial data by applying a fourth one or more machine-learning models that group the financial data into hierarchical categories and subcategories based on the account information, wherein the fourth one or more machine-learning models include supervised techniques comprising neural networks, long short-term memory, support vector machines, or decision trees trained on labeled data to predict the category and subcategory for the extracted financial data;

generate a financial report template that defines a structure of a profit and loss statement, wherein the financial report template includes a set of profit and loss indicators that are dynamically generated, based at least in part on the financial data, by deploying a first one or more machine-learning models trained in financial accounting practices to analyze the financial data for generating the set of profit and loss indicators that lead to net income;

generate, by deploying a second one or more machine-learning models, a mapping strategy that automatically links a profit and loss indicator of the set of profit and loss indicators to a relevant financial data element of the financial data from a chart of accounts;

output, based on the financial report template and the mapping strategy, a profit and loss statement that includes a set of estimated values associated with the set of profit and loss indicators for a specified time frame;

evaluate the profit and loss statement by applying a third one or more machine learning models to detect anomalies; and generate, via a graphical user interface (GUI), a response in real-time that includes a description of valuable insights, anomalies and patterns in a natural language format based on the evaluation.

10. The system of claim 9, wherein the response further includes:

providing, via the GUI, an interactive session to ask a question in the natural language format related to the financial report; and generating in real-time, based on the question, an answer in the natural language format by deploying one or more large language models (LLMs) that are configured to generate analytics and predictions based on the evaluation of the financial report.

11. The system of claim 9, wherein the response further includes:

categorizing the financial data by applying a fourth one or more machine-learning models that group the financial data into categories and subcategories based on the account information.

12. The system of claim 9, wherein the financial report template is customized by one of:

adding one or more new performance indicators, wherein adding a new performance indicator of the one or more new performance indicators includes:

inputting, via the GUI, a brief description in the natural language format from a user; and deploying a natural language processing to extract a meaningful performance indicator from the brief description; or deleting, via the GUI, one or more performance indicators of the set of profit and loss indicators.

13. The system of claim 12, further includes:

storing the customized financial report template into a database.

14. The system of claim 9, further includes:

perform quality checks and validations on the mapping strategy to ensure accuracy and consistency;

validate the mapping strategy to confirm that the profit and loss indicator of the set of profit and loss indicators is correctly mapped to the relevant financial data element of the financial data;

determine that the profit and loss indicator of the set of profit and loss indicator of the set of profit and loss indicators in the mapping strategy is not correctly mapped to the relevant financial data element of the financial data;

mapping, based on the determination, a different financial element from the financial data to the profit and loss indicator of the set of profit and loss indicators in the mapping strategy; and storing the mapping strategy into a database.

15. The system of claim 9, wherein the natural language format includes one or more of: English, German, Polish, French, Espanol or Chinese.

16. The system of claim 9, further includes:

receiving one or more financial documents comprising the financial data of the business entity, wherein a financial document of the one or more financial documents includes an invoice, a receipt, a bank statement, or a purchase order; and extracting the financial data by applying natural language processing to interpret unstructured data within the financial document of the one or more financial documents.

17. A computer-program product tangibly embodied in a non-transitory machine-readable storage medium, including instructions configured to cause one or more data processors to perform a method including:

receiving financial data of a business entity from one or more data sources, wherein the financial data includes transaction details and account information, wherein the financial data is extracted from one or more financial documents comprising an invoice, a receipt, a bank statement, or a purchase order by applying optical character recognition (OCR) technology to transform images from scanned financial documents into machine-readable text, and by applying data extraction algorithms that identify and extract amounts, dates, and transaction details from the machine-readable text;

categorizing the financial data by applying a fourth one or more machine-learning models that group the financial data into hierarchical categories and subcategories based on the account information, wherein the fourth one or more machine-learning models include supervised techniques comprising neural networks, long short-term memory, support vector machines, or decision trees trained on labeled data to predict the category and subcategory for the extracted financial data;

generating a financial report template that defines a structure of a profit and loss report, wherein the financial report template includes a set of profit and loss indicators that are dynamically generated, based at least in part on the financial data, by deploying a first one or more machine-learning models trained in financial accounting practices to analyze the financial data for generating the set of profit and loss indicators that lead to net income;

generating, by deploying a second one or more machine-learning models, a mapping strategy that automatically links a profit and loss indicator of the set of profit and loss indicators to a relevant financial data element of the financial data from a chart of accounts;

outputting, based on the financial report template and the mapping strategy, a profit and loss statement that includes a set of estimated values associated with the set of profit and loss indicators for a specified time frame;

evaluating the profit and loss statement by applying a third one or more machine learning models to detected anomalies;

generating, via a graphical user interface (GUI), a response in real-time that includes a description of valuable insights, anomalies and patterns in a natural language format based on evaluating the profit and loss statement;

providing, via the GUI, an interactive session to ask a question in the natural language format related to the profit and loss statement, wherein the natural language format includes one or more of: English, German, Polish, French, Espanol or Chinese; and generating in real-time, based on the question, an answer in the natural language format by deploying one or more large language models (LLMs) that are configured to generate analytics and predictions based on the evaluation of the profit and loss statement.

18. The computer-program product of claim 17, wherein the method further includes:

categorizing the financial data by applying a fourth one or more machine-learning models that group the financial data into categories and subcategories based on account information.

19. The computer-program product of claim 17, wherein the financial report template is customized by:

adding one or more new performance indicators, wherein adding a new performance indicator of the one or more new performance indicators includes:

inputting, via the GUI, a brief description in the natural language format from a user; and deploying a natural language processing to extract a meaningful performance indicator from the brief description; or deleting, via the GUI, one or more performance indicators of the set of profit and loss indicators, wherein the method further includes storing the customized financial report template into a database.

20. The computer-program product of claim 17, further includes:

performing quality checks and validations on the mapping strategy to ensure accuracy and consistency;

validating the mapping strategy to confirm that the profit and loss indicator of the set of profit and loss indicators is correctly mapped to the relevant financial data element of the financial data;

determining that the profit and loss indicator of the set of profit and loss indicators in the mapping strategy is not correctly mapped to the relevant financial data element of the financial data;

mapping, based on the determination, a different financial element from the financial data to the profit and loss indicator of the set of profit and loss indicators in the mapping strategy; and storing the mapping strategy into a database.

* * * * *